US012472483B2

United States Patent
Xia et al.

(10) Patent No.: US 12,472,483 B2
(45) Date of Patent: Nov. 18, 2025

(54) SORBENT MATERIALS AND WATER HARVESTING DEVICES INCLUDING THE SAME

(71) Applicant: The Johns Hopkins University, Baltimore, MD (US)

(72) Inventors: Zhiyong Xia, Rockville, MD (US); Matthew W. Logan, Columbia, MD (US); Spencer A. Langevin, Columbia, MD (US)

(73) Assignee: The Johns Hopkins University, Baltimore, MD (US)

( * ) Notice: Subject to any disclaimer, the term of this patent is extended or adjusted under 35 U.S.C. 154(b) by 452 days.

(21) Appl. No.: 17/899,879

(22) Filed: Aug. 31, 2022

(65) Prior Publication Data

US 2023/0001381 A1 Jan. 5, 2023

Related U.S. Application Data

(63) Continuation-in-part of application No. 17/209,386, filed on Mar. 23, 2021, now Pat. No. 11,638,899.

(Continued)

(51) Int. Cl.
*B01D 53/04* (2006.01)
*B01D 53/047* (2006.01)
(Continued)

(52) U.S. Cl.
CPC ........ *B01J 20/226* (2013.01); *B01D 53/0423* (2013.01); *B01D 53/0438* (2013.01);
(Continued)

(58) Field of Classification Search
CPC .. B01J 20/226; B01J 20/261; B01J 20/28007; B01J 20/28023; B01J 20/28038; B01J 20/28047; B01J 20/28064; B01J 20/28066; B01J 20/2808; B01J 20/28083; B01J 20/3007; B01D 53/0423; B01D 53/0438;
(Continued)

(56) References Cited

U.S. PATENT DOCUMENTS

| 5,648,508 A | 7/1997 | Yaghi |
| 10,561,761 B2 | 2/2020 | Xiao et al. |

(Continued)

FOREIGN PATENT DOCUMENTS

| KR | 20210060207 A | * | 5/2021 |
| WO | WO-2017223046 A1 | * | 12/2017 |

OTHER PUBLICATIONS

Machine-generated English translation of KR20210060207A, published May 26, 2021 (Year: 2021).*

(Continued)

*Primary Examiner* — Frank M Lawrence, Jr.
(74) *Attorney, Agent, or Firm* — Noah J. Hayward

(57) ABSTRACT

Sorbent materials comprising a nanofiber composite including a polymeric material defining a continuous phase and at least one metal organic framework (MOF) material defining a discontinuous phase are provided. The at least one MOF material is dispersed throughout the continuous phase of the polymeric material. Fibrous mats comprising the sorbent materials are also provided. Water harvesting devices utilizing the sorbent materials are also provided.

19 Claims, 13 Drawing Sheets

Related U.S. Application Data

(60) Provisional application No. 63/249,710, filed on Sep. 29, 2021, provisional application No. 63/122,515, filed on Dec. 8, 2020, provisional application No. 62/993,762, filed on Mar. 24, 2020.

(51) Int. Cl.
| | |
|---|---|
| *B01D 53/26* | (2006.01) |
| *B01D 53/28* | (2006.01) |
| *B01J 20/22* | (2006.01) |
| *B01J 20/26* | (2006.01) |
| *B01J 20/28* | (2006.01) |
| *B01J 20/30* | (2006.01) |
| *E03B 3/28* | (2006.01) |

(52) U.S. Cl.
CPC ....... *B01D 53/0462* (2013.01); *B01D 53/047* (2013.01); *B01D 53/261* (2013.01); *B01D 53/28* (2013.01); *B01J 20/261* (2013.01); *B01J 20/28007* (2013.01); *B01J 20/28023* (2013.01); *B01J 20/28038* (2013.01); *B01J 20/28047* (2013.01); *B01J 20/28064* (2013.01); *B01J 20/28066* (2013.01); *B01J 20/2808* (2013.01); *B01J 20/28083* (2013.01); *B01J 20/3007* (2013.01); *E03B 3/28* (2013.01); *B01D 2253/202* (2013.01); *B01D 2253/204* (2013.01); *B01D 2253/25* (2013.01); *B01D 2253/304* (2013.01); *B01D 2253/306* (2013.01); *B01D 2253/308* (2013.01); *B01D 2257/80* (2013.01)

(58) Field of Classification Search
CPC .............. B01D 53/0462; B01D 53/047; B01D 53/261; B01D 53/28; B01D 2253/202; B01D 2253/204; B01D 2253/25; B01D 2253/304; B01D 2253/306; B01D 2253/308; B01D 2257/80; B01D 53/02; E03B 3/28
USPC ....... 96/108, 121, 126; 95/96, 117; 502/400, 502/401
See application file for complete search history.

(56) References Cited

U.S. PATENT DOCUMENTS

| | | |
|---|---|---|
| 2020/0282379 A1 | 9/2020 | Mulet et al. |
| 2021/0055010 A1 | 2/2021 | McGrail et al. |
| 2021/0069639 A1 | 3/2021 | Wang et al. |
| 2021/0156124 A1 | 5/2021 | Yaghi et al. |
| 2021/0283574 A1 | 9/2021 | Yaghi et al. |
| 2022/0258144 A1* | 8/2022 | Luz-Minguez .... B01D 53/8668 |
| 2022/0280915 A1 | 9/2022 | Yilmaz Kanargi et al. |
| 2022/0370984 A1* | 11/2022 | Weston ................. B01J 20/226 |
| 2022/0401915 A1* | 12/2022 | Koh ...................... B01J 20/3085 |
| 2023/0167591 A1* | 6/2023 | Soliman ................ B82Y 30/00 |
| 2024/0109025 A1* | 4/2024 | Zhao ..................... B01J 20/3272 |

OTHER PUBLICATIONS

Matthew W. Logan, et al., "Reversible Atmospheric Water Harvesting Using Metal-Organic Frameworks," Scientific Reports 10:1492, 2020, pp. 1-11.

Zhiyong Xia, et al., "Determination of Crosslinking Density of Hydrogels Prepared from Microcrystalline Cellulose," J. Appl. Polym. Sci. 2013, Jun. 6, 2012, DOI: 10.1002/APP.38052, pp. 4537-4541.

Zhiyong Xia, et al., "Structure and relaxation in cellulose hydrogels," J. Appl. Polym. Sci. 2015, DOI: 10.1002/APP.42071, Jan. 30, 2015, pp. 1-5.

Zhiyong Xia, et al., "Heavy metal ion removal by thiol functionalized aluminum oxidehydroxide nanowhiskers," Applied Surface Science 416, Apr. 20, 2017, pp. 565-573.

James K. Johnson, et al., "Advanced Filtration Membranes for the Removal of Perfluoroalkyl Species from Water," ACS Omega, May 2, 2019, 4, pp. 8001-8006.

Konstantinos Gerasopoulos, et al., "Effects of Engineered Wettability on the Efficiency of Dew Collection," ACS Appl. Mater. Interfaces Jan. 3, 2018, 10, pp. 4066-4076.

Chao-Wei Hwang, et al., "Stem cell impregnated nanofiber stent sleeve for on-stent production and intravascular delivery of paracrine factors," Biomaterials 52, Feb. 28, 2015, pp. 318-326.

Nikita Hanikel, "Rapid Cycling and Exceptional Yield in a Metal-Organic Framework Water Harvester," ACS Cent. Sci., Aug. 27, 2019, 5, pp. 1699-1706.

Fei Zhao, et al., "Super Moisture-Absorbent Gels for All-Weather Atmospheric Water Harvesting," Adv. Mater., 2019, 31, 1806446 pp. 1-7.

Pedro J. Rivero, "Nanomaterials for Functional Textiles and Fibers," Rivero et al. Nanoscale Research Letters, 2015, 10:501, pp. 1-22.

Shingjiang Jessie Lue, et al., "Tuning of Lower Critical Solution Temperature (LCST) of Poly(N-Isopropylacrylamide-co-Acrylic acid) Hydrogels," Journal of Macromolecular Science, Part B, 50:3, Jan. 24, 2011, DOI: 10.1080/00222341003784550, pp. 563-579.

* cited by examiner

☐ = Organic Linker
◯ = Metal Ion/Cluster

SORBENT MATERIALS AND WATER HARVESTING DEVICES INCLUDING THE SAME

CROSS-REFERENCE TO RELATED APPLICATIONS

This application is a continuation-in-part of and claims priority to and the benefit of prior-filed, co-pending U.S. application Ser. No. 17/209,386 filed on Mar. 23, 2021, which claims priority to and the benefit of prior-filed U.S. Provisional Application Nos. 62/993,762 and 63/122,515, filed on Mar. 24, 2020 and Dec. 8, 2020, respectively, the contents of each of which are herein incorporated by reference in their entireties. This application also claims priority to and the benefit of prior-filed, co-pending U.S. Provisional Application No. 63/249,710, filed on Sep. 29, 2021, the content of which is herein incorporated by reference in its entirety.

TECHNICAL FIELD

Example embodiments of the presently-disclosed invention relate generally to sorbent materials comprising a nanofiber composite or a plurality of nanofiber composites. The nanofiber composite may include a polymeric material defining a continuous phase and at least one metal organic framework (MOF) material defining a discontinuous phase, wherein the at least one MOF material is dispersed throughout the continuous phase of the polymeric material. The sorbent materials may be utilized in a water harvesting devices including at least one adsorption column (e.g., a temperature swing adsorption (TSA) column and/or a pressure swing adsorption (PSA) column), in which the at least one adsorption column includes a sorbent material as described and disclosed herein. The sorbent material retains (e.g., adsorbs) water from an air source passing through the TSA and/or PSA under a first condition and releases the water under a second condition. Embodiments of the invention also relate to methods of harvesting water from air.

BACKGROUND

Despite the rapid growth of modern infrastructure, access to clean water remains a critical issue and challenge to humanity that is projected to increase at a rate faster than that of energy production. Limited access to freshwater due to the absence of sources, such as lakes, rivers, and groundwater is becoming even more problematic, with many of these sources becoming contaminated from human activities. Traditional means to acquire clean water, such as reverse osmosis and distillation, is costly and energy-intensive which in turn restricts real-world uses.

The passive capture of clean water from humid air under a wide range of relative humidity without reliance on bulky equipment and high energy has been a substantial challenge. Such an approach, however, could provide a potential environmentally friendly alternative to traditional water harvesting methods. Direct water harvesting from air has been demonstrated through cooling water vapor below its saturation pressure. However, this approach is not practical in dry climates due to its high energy demands. In this regard, there remains a need in the art for alternative devices and methods of harvesting water

BRIEF SUMMARY

Non-limiting, example embodiments include a sorbent material comprising a nanofiber composite including a polymeric material defining a continuous phase and at least one metal organic framework (MOF) material defining a discontinuous phase. In this regard, the at least one MOF material is dispersed throughout the continuous phase of the polymeric material.

In another aspect, the invention provides a fibrous mat comprising a plurality of nanofiber composites. The plurality of nanofiber composites may each comprise a polymeric material defining a continuous phase and at least one metal organic framework (MOF) material defining a discontinuous phase. In this regard, the at least one MOF material is dispersed throughout the continuous phase of the polymeric material. In accordance with certain embodiments of the invention, the fibrous mat may comprise a woven fabric or a nonwoven fabric.

In another aspect, the invention provides a method of making a sorbent material, in which the method may comprise forming a spinning composition comprising a polymeric material and at least one at least one metal organic framework (MOF) material dispersed throughout the polymeric material. The method may further comprise a step of forming one or more nanofiber composites including the polymeric material defining a continuous phase and the least one (MOF) material defining a discontinuous phase dispersed throughout the continuous phase of the polymeric material. In accordance with certain embodiments of the invention, the step of forming one or more nanofiber composites may comprise electrospinning the spinning composition, meltspinning the spinning composition, or solutionspinning the spinning composition.

In another aspect, the invention provides a water harvesting device including at least one adsorption column (e.g., a temperature swing adsorption (TSA) column and/or a pressure swing adsorption (PSA) column), in which the at least one adsorption column includes at least a first adsorption column including a first inlet, a first outlet, and a first interior region. The water harvesting device may also include a sorbent material located within the first interior region of the first adsorption column, in which the sorbent material comprises a plurality of nanofiber composites. The plurality of nanofiber composites may each comprise a polymeric material defining a continuous phase and at least one MOF) material defining a discontinuous phase. In this regard, the at least one MOF material is dispersed throughout the continuous phase of the polymeric material.

In another aspect, the invention provides a method of harvesting water from air. In accordance with certain embodiments, the method may comprises providing a water harvesting device, in which the water harvesting device includes at least one adsorption column (e.g., a temperature swing adsorption (TSA) column and/or a pressure swing adsorption (PSA) column) having a sorbent material located within an interior region of the at least one adsorption column. The sorbent material may comprise a plurality of nanofiber composites. The plurality of nanofiber composites may each comprise a polymeric material defining a continuous phase and at least one metal organic framework (MOF) material defining a discontinuous phase. In accordance with certain embodiments, the method may comprise initiating intake of air from an environment into the device and retaining water on or within the sorbent material. The method may also comprise releasing at least a portion of the water retained by the sorbent material by directly or indirectly increasing the temperature of the sorbent material and/or reducing the pressure within the at least one adsorption chamber. The method may also comprises collecting the portion of water.

BRIEF DESCRIPTION OF THE DRAWINGS

Example embodiments of the invention now will be described more fully with reference to the accompanying drawings, in which some, but not all example embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

DETAILED DESCRIPTION

Figure 1:
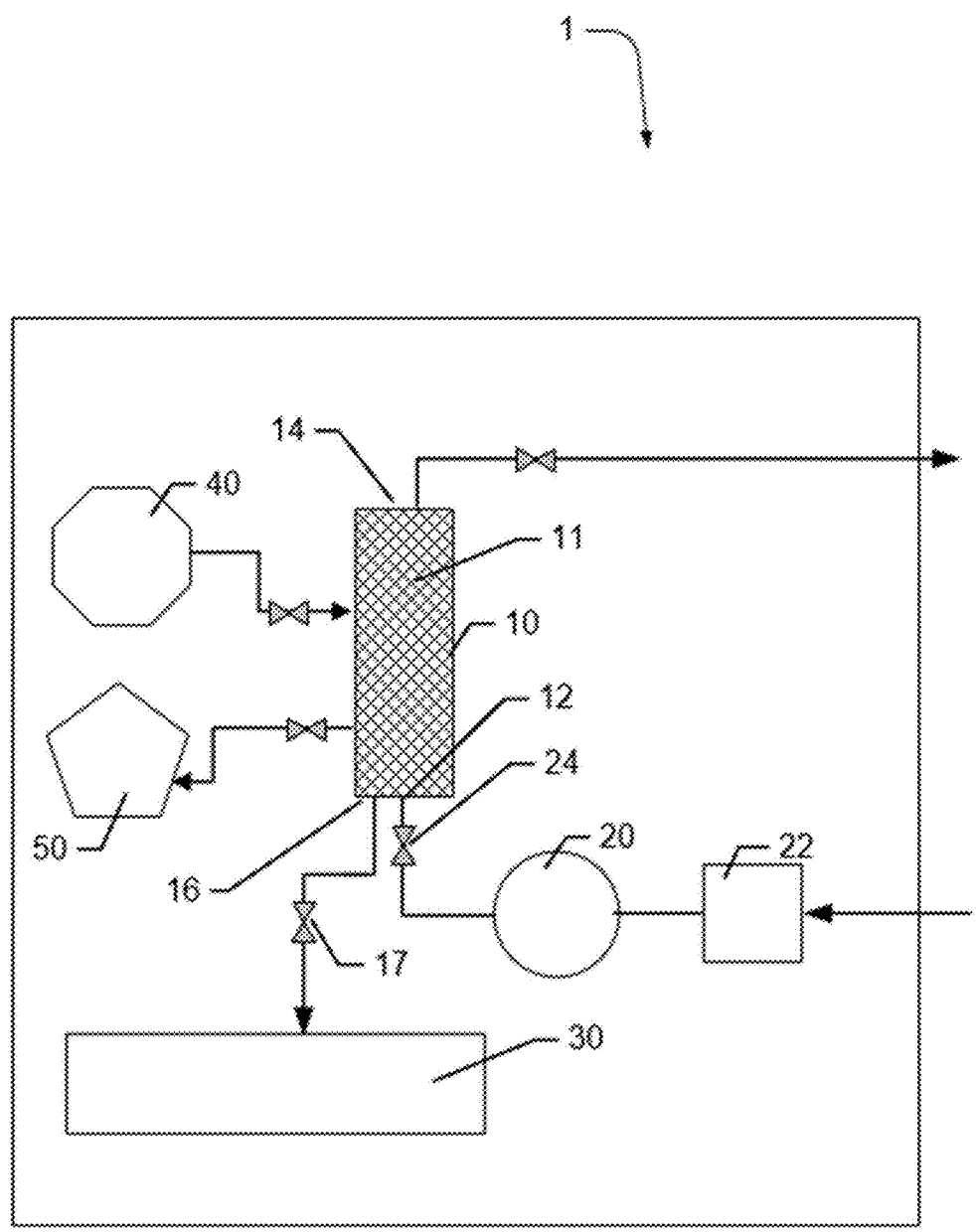
FIG. 1 illustrates a schematic of a water harvesting device according to certain embodiments of the invention.

Non-limiting, example embodiments of the invention now will be described more fully hereinafter with reference to the accompanying drawings, in which some, but not all embodiments of the invention are shown. Indeed, the present invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

Embodiments of the present invention relate generally to accessing non-traditional water reserves, such as atmospheric water vapor. In this regard, certain embodiments in accordance with the invention provide the ability to supply freshwater on-demand virtually anywhere on the earth. For example, atmospheric water harvesting, in accordance with certain embodiments of the invention, provides an attractive alternative by enabling access to the omnipresent water vapor in the earth's atmosphere off the grid and in virtually any environment. Accordingly, the present invention, in accordance with certain embodiments of the invention, provide sorbent materials comprising a nanofiber composite including a polymeric material defining a continuous phase and at least one metal organic framework (MOF) material defining a discontinuous phase. In this regard, the at least one MOF material is dispersed throughout the continuous phase of the polymeric material. For instance, the polymeric material may comprise a gel material or a hydrogel material. Accordingly, certain embodiments of the invention simultaneously take advantage of the fast rate of water absorption and/or desorption associated with certain gel or hydrogel materials with the relatively high water retaining capacity (e.g., mass of water retained per mass of material absorbing the water) associated with certain MOF materials.

Sorbent materials, in accordance with certain embodiments of the invention, may be particularly well suited for use inside a water harvesting device (e.g., atmospheric water harvesting device). In this regard, certain embodiments of the invention provide water harvesting devices that may include one of more absorption columns housing one or more sorption materials, such as those described and disclosed herein. The absorption columns may include one or more temperature swing adsorption (TSA) column and/or one or more pressure swing adsorption (PSA) columns that house one or more sorption materials therein. In accordance with certain embodiments of the invention, for example, the water harvesting device may include a sorption material comprising one or more nanofiber composites, such as those disclosed herein, that harvest (e.g., capture) water from air.

As noted above, certain embodiments of the invention provide a sorbent material comprising a nanofiber composite including a polymeric material defining a continuous phase and at least one MOF material defining a discontinuous phase. In this regard, the at least one MOF material is dispersed throughout the continuous phase of the polymeric material.

In accordance with certain embodiments of the invention, the nanofiber composite may have an average diameter from about 0.5 nm to about 5000 nm, such as at least about nay any of the following: 0.5, 1, 5, 10, 20, 30, 40, 50, 60, 70, 80, 90, 100, 125, 150, 175, 200, 300, 400, and 500 nm, and/or at most about any of the following: 5000, 4500, 4000, 3500, 3000, 2500, 2000, 1500, 1000, 900, 800, 700, 600, and 500 nm. The nanofiber composites, for example, may comprise continuous fibers, discontinuous fibers (e.g., staple fibers), or a combination thereof. Additionally or alternatively, the nanofiber composite may be an electrospun fiber, a meltspun fiber, or a solution-spun fiber.

The polymeric material of the nanofiber composites may comprise a variety of water absorbing materials, such as those that exhibit water absorption below a lower critical solution temperature and desorb or release absorbed or retained water above the lower critical solution temperature. By way of example, the polymeric material may comprise N-isopropylacrylamide (NIPAM), a poly(NIPAM), a copolymer including NIPAM, or a polymeric blend including NIPAM and one more additional polymers. In accordance with certain embodiments of the invention, the polymeric material may comprise from about 10% to about 100% by weight of NIPAM, such as at least about any of the following: 10, 20, 30, 40, and 50% by weight of NIPAM, and/or at most about any of the following: 100, 98, 95, 90, 80, 70, 60, and 50% by weight of NIPAM. Additionally or alternatively, the polymeric material may comprise an average molecular weight above a molecular weight of entanglement for the given polymeric material. By way of example only, the polymeric material may have an average molecular weight of at least about 60,000 g/mol, such as at least about any of the following 80,000; 100,000; 150,000; 200,000; 250,000; 300,000; 350,000; 400,000; 500,000; and 600,000 g/mol.

In accordance with certain embodiments of the invention, the nanofiber composite may be formed, as referenced above, from a hydrogel material. For example only, the hydrogel material may be produced from a super water absorbing ionic liquid (e.g., 1-ethyl-3-methyl-imidazolium acetate) copolymerized with, for example, NIPAM. In accordance with certain embodiments of the invention, the hydrogels may be spun (e.g., electrically spun) into nanofibers (e.g., nanofiber composites having one or more MOF materials dispersed throughout) to form fibrous mats or nanofabrics (e.g., consolidated or non-consolidated plurality of nanofiber composites). Although not necessary, in accordance with certain embodiments of the invention, solvent selection in an electro-spinning process of the hydrogels may facilitate or create the formation of surface porosities on the surface of the nanofibers to provide fast water diffusion and desorption of the resulting nanofiber composites. In accordance with certain embodiments of the invention, the nanofiber composites may optionally comprise a highly porous nature. For example, the surface area of the nanofiber composites may include a plurality of pores or pits formed therein.

The nanofiber composites, in accordance with certain embodiments of the invention, may comprise at least one MOF material and/or one or more covalent organic framework (COF). The COFs may comprise two-dimensional or a three-dimensional organic solids with extended structures in which building blocks are linked by strong covalent bonds. The COFs comprise a porous and crystalline structure that may be made entirely from light elements (e.g., H, B, C, N, and O) that may form strong covalent bonds. Similar to the MOFs, the COFs provide frameworks that can be functionalized in a manner similar to those described herein with respect to MOFs. In accordance with certain embodiments of the invention, the disclosure of properties associated with one or more MOFs may also be attributed to one or more COFs. In this regard, certain embodiments of the invention include one or more COFs alone or in combination with one or more MOFs dispersed throughout the continuous phase of the polymeric material of the nanofiber composites. For sake of brevity, it should be appreciated that discussion and disclosure of MOFs in the nanofiber composites and in water harvesting devices are equally applicable one or more COFs being present in the nanofiber composite and/or in water harvesting devices, in accordance with certain embodiments of the invention.

In accordance with certain embodiments of the invention, the MOF material may comprise an average pore size from 5 angstroms (Å) to about 300 Å, such as at least about any of the following: 5, 10, 15, 20, 30, 40, 50, 60, 70, 80, 90, 100, 125, 150, 175, and 200 Å, and/or at most about any of the following: 300, 275, 250, and 200 Å. Additionally or alternatively, the MOF material may have an average surface area from 800 $m^2/g$ to 6000 $m^2/g$, such as at least about any of the following: 800, 900, 1000, 1200, 1400, 1500, 1600, 1800, 2000, 2200, 2400, and 2500 $m^2/g$, and/or at most about any of the following: 6000, 5000, 4000, 3500, 3400, 3200, 3000, 2800, 2600, and 2500 $m^2/g$. In accordance with certain embodiments of the invention, the surface area may be determined from Brunauer-Emmett-Tellar (BET) model analysis of $N_2$ gas adsorption-desorption isotherm at 77K, which is the most common method to describe the accessible surface area that a MOF material has. In this regard, nitrogen gas adsorption isotherms are performed on a QUANTACHROME® NOVA® 2200e surface area and porosity analyzer at 77 K. Prior to the tests, all samples are thermally activated overnight at 100° C. under 0.01 mmHg. Helium gas is used to measure the dead space volume prior to measurements. BET surface areas can be determined by linear least-square fitting of the BET plot, the upper working limits can be provided by the Rouquerol analysis.

In accordance with certain embodiments of the invention, the MOF material may comprises a water uptake capacity from 10 to 5000 grams (g) of water per kilogram (kg) of MOF material under a relative humidity ranging from 10 to 100%, such as at least about any of the following: 10, 20, 50, 100, 150, 200, 250, 300, 350, 400, 500, 600, 700, 800, 900, 1000, 1500, 2000, and 2500 grams (g) of water per kilogram (kg) of MOF material, and/or at most about any of the following: 5000, 4500, 4000, 3500, 3000, 2500, 2000, 1800, 1600, 1500, 1400, 1200, and 1000 grams (g) of water per kilogram (kg) of MOF material; wherein the water uptake capacity is determined gravimetrically and the value may be taken from the first cycle adsorption at 70% relative humidity at 22° C. at ambient pressure. Additionally or alternatively, the MOF material may comprise a working capacity of the MOF material ranges from 2 to 5000 grams (g) of water per kilogram (kg) of MOF material, such as at least about any of the following: 2, 5, 10, 20, 50, 100, 150, 200, 250, 300, 350, 400, 500, 600, 700, 800, 900, 1000, 1500, 2000, and 2500 grams (g) of water per kilogram (kg) of MOF material, and/or at most about any of the following: 5000, 4500, 4000, 3500, 3000, 2500, 2000, 1800, 1600, 1500, 1400, 1200, and 1000 grams (g) of water per kilogram (kg) of MOF material; wherein the working capacity of the MOF material may be defined as the difference between an amount of water adsorbed and desorbed.

The MOF material, in accordance with certain embodiments of the invention, may have a water desorption percentage from 15 to 100%, such as at least about any of the following: 15, 25, 50, 60, 70, 80, 90, and 95%, and/or at most about any of the following: 100, 99, 98, 97, 96, and 95%. The term "water desorption percentage" refers to the percentage of previously retained water that is released by the sorbent material (e.g., the MOF material). For example, if the sorbent material captures 1000 grams of water and releases 850 grams of this water during a desorbing operation, then the water desorption percentage would be 85%.

In accordance with certain embodiments of the invention, the MOF material may comprise one or more organic linkers, which may independently comprise either one or more hydrophilic or hydrophobic organic linkers. The one or more organic linkers may comprise a variety of functional groups, such a of hydroxyl group, a carbonyl group, a carboxyl group, an amino group, a sulfhydryl group, an ether, an ester, or any combination thereof. In accordance with certain embodiments of the invention, the one or more organic linkers comprise a hydrophilic linker (or consisting of hydrophilic organic linkers) that enhances water's affinity to the MOF material. By way of example only, the one or more hydrophilic organic linkers may include poly(ethylene glycol) functionality, poly(vinyl alcohol) functionality, polyacrylamide functionality, polyglutamic acid functionality, acrylates, methacrylate, or any combinations thereof.

The MOF material, in accordance with certain embodiments of the invention, may comprise one or more of the following examples: aluminum fumarate (AlFu), MOF-303, Al-CAU-10, Al-MIL-160, Cr-MIL-101, Ti-MIL-125, Ti-MIL-125-NH2, (Al, Fe, Cr)-MIL-100, Zr-MOF-801, Zr-MOF-808, Zr-UiO-66, Zr-UiO-66-NH2, Zr-MOF-841, Al-MIL-53, Cu-HKUST-1, Al-CAU-10, Al-MIL-160, and (Zn, Mg, Ni)-MOF-74. In accordance with certain embodiments of the invention, the MOF material may have covalently bound functionalities to the organic linker, such as Ti-MIL-125 vs Ti-MIL-125-NH2.

In accordance with certain embodiments of the invention, the MOF material the one or more organic linkers (e.g., one or more hydrophilic organic linkers) have a desorption temperature (e.g., temperature at which the MOF material releases previously captured water) of at least about 30° C., such as at least about any of the following: 30, 40, 50, 60, 70, 80, 90, 100, and 120° C., and/or at most about any of the following: 200, 180, 160, 150, 140, and 120° C.

In accordance with certain embodiments of the invention, the MOF material may have a bulk density from 0.2 to about 3 g/cm3, such as at least about any of the following: 0.2, 0.4, 0.6, 0.8, 1, 1.2, 1.4, and 1.6 g/cm3, and/or at least about any of the following: 3, 2.8, 2.6, 2.4, 2, 1.8, and 1.6 g/cm3.

Individual MOF materials may have of be formed with unique structural topology and/or chemical functionalities that facilitate improved performance for atmospheric water extraction. For example, Cr-MIL-101 demonstrated an impressive water generation rate of 8.9 L/kgMOF/day, which outperforms any previously reported values for MOF-based atmospheric water extractor. In addition, a close to 100% water desorption was achieved at 50° C. in less than 2 hours in most of MOFs evaluated, and as summarized in Table 1 below. The MOF materials, which are summarized in Table 1, were studied with $N_2$ gas for determining water vapor sorption properties. Surface area calculated from BET model analysis of $N_2$ gas adsorption-desorption isotherm at 77 K as noted above. Pore volume was calculated at p/po=0.4 of $N_2$ adsorption isotherm (77 K). Water vapor uptake capacity was determined gravimetrically; the value is taken from the first cycle adsorption at 70% RH and 22° C. at ambient pressure. Working capacity was determined gravimetrically by the difference in the amount of water desorbed and adsorbed during water cycle stability and recovery studies.

TABLE 1

| MOF | $SA^a$ ($m^2\,g^{-1}$) | $Vp^b$ ($cm^3\,g^{-1}$) | Uptake capacity$^c$ ($g\,kg^{-1}$) | Working capacity$^d$ ($g\,kg^{-1}$) | Water desorbed (%) |
|---|---|---|---|---|---|
| Ti-MIL-125 | 1153 | 0.47 | 323 | 313 | 97 |
| Ti-MZL-125-NH2 | 1358 | 0.55 | 413 | 409 | 99 |
| Zr-UiO-66 | 959 | 0.40 | 347 | 338 | 97 |
| Zr-UiO-66-NH2 | 1109 | 0.46 | 364 | 355 | 98 |
| Zr-MOF-808 | 1880 | 0.69 | 744 | 714 | 96 |
| Cr-MIL-101 | 2579 | 1.63 | 1263 | 1246 | 98 |
| Cu-HKUST-1 | 1512 | 0.41 | 218 | 105 | 48 |
| Al-MIL-53 | 814 | 0.41 | 13 | 2 | 15 |
| Zn-ZIF-8 | 1835 | 0.69 | 15 | 6 | 40 |

$^a$Surface area calculated from Brunauer-Emmett-Teller (BET) model analysis of $N_2$ gas adsorption-desorption isotherm at 77K.
$^b$Pore volume calculated at $p/p_0 = 0.4$ of $N_2$ adsorption isotherm (77K).
$^c$Water vapor uptake capacity was determined gravimetrically; the value is taken from the first cycle adsorption at 70% RH and 22° C. at ambient pressure.
$^d$Working capacity was determined gravimetrically by the difference in the amount of water desorbed and adsorbed during water cycle stability and recovery studies.

In accordance with certain embodiments of the invention, the MOF material may comprise a low relative humidity uptake capacity, such as Al-MOF-303, Al-CAU-10, Al-FUM, Zr-MOF-801, Zr-MOF-841, and COF-432. Additional MOF materials may be configured, as noted above, with specific chemical and topological modifications. For example, existing MOF materials may be modified by, for example, ligand exchange, chemical grafting, and modify metal centers directly to instill water capturing or water attracting features. The addition of more polar features, such as carboxylic acids, and framework-supported ionic liquid may be particularly desirable in accordance with certain embodiments of the invention. Example modifications are illustrated in Schematic 1 below. For example, examples 1 and 2 in Schematic 1 illustrates modification of inorganic ion/cluster while examples 3-5 illustrates example modifications to organic linkers.

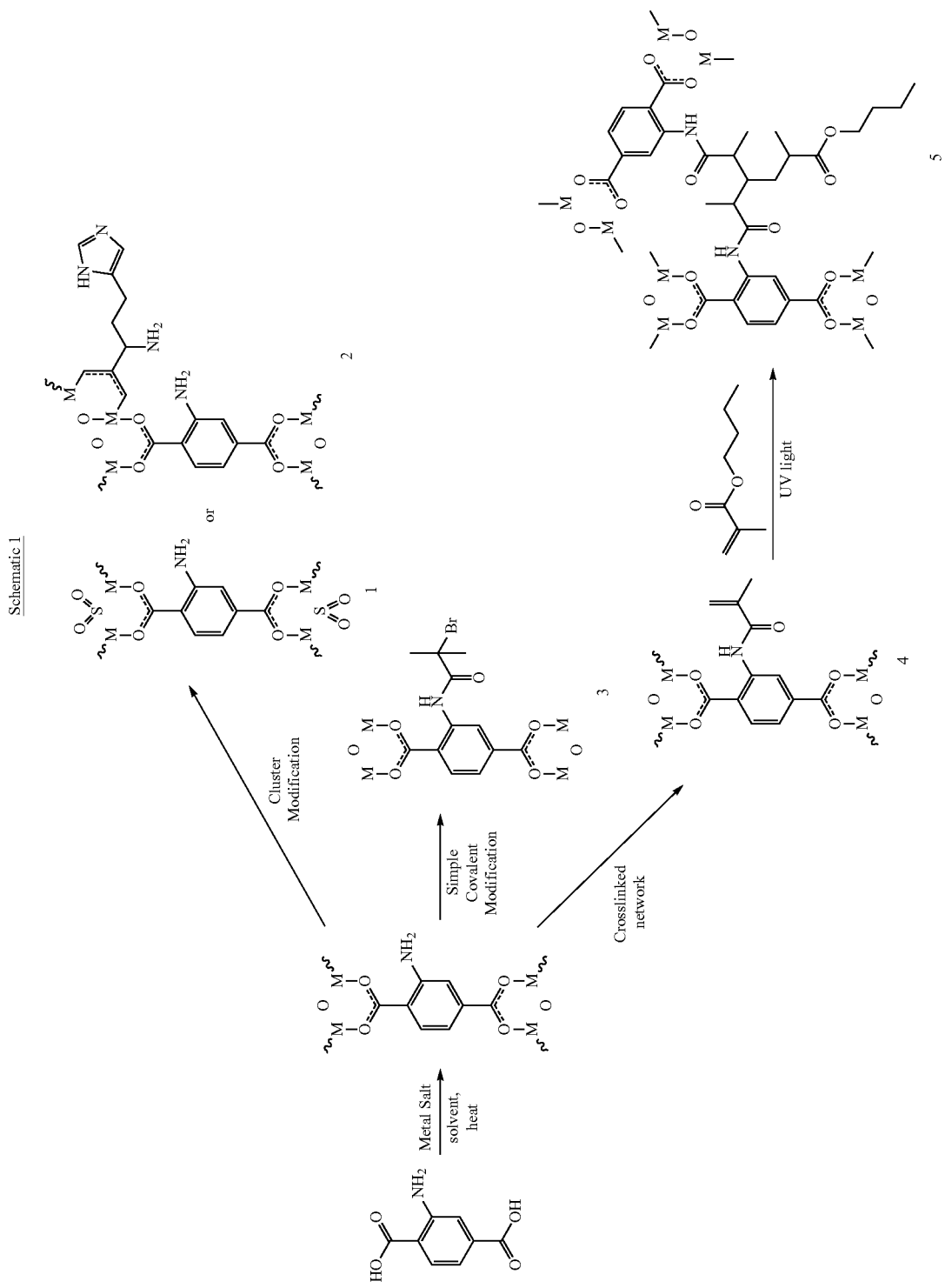
Schematic 1

In accordance with certain embodiments of the invention, the sorbent materials (e.g., nanofiber composite) may comprise from about 1% to about 80% by weight on a dry basis of the at least one MOF material, such as at least about any of the following: 1, 3, 5, 8, 10, 12, 15, 18, 20, 25, 30, 35, and 40% by weight on a dry basis of the at least one MOF material, and/or at most about any of the following: 80, 75, 70, 65, 60, 55, 50, 45, and 40% by weight on a dry basis of the at least one MOF material. Additionally or alternatively, the sorbent material (e.g., the nanofiber composite) may comprise from about 20% to about 99% by weight on a dry basis of the polymeric material, such as at least about any of the following: 1, 3, 5, 8, 10, 12, 15, 18, 20, 25, 30, 35, and 40% by weight on a dry basis of the polymeric material, and/or at most about any of the following: 80, 75, 70, 65, 60, 55, 50, 45, and 40% by weight on a dry basis of the polymeric material.

In another aspect, the invention provides a fibrous mat comprising a plurality of nanofiber composites. The plurality of nanofiber composites may each comprise a polymeric material, such as described and disclosed herein, and defining a continuous phase and at least one MOF material, such as described and disclosed herein, defining a discontinuous phase. In this regard, the at least one MOF material may be dispersed throughout the continuous phase of the polymeric material. In accordance with certain embodiments of the invention, the fibrous mat may comprise a woven fabric or a nonwoven fabric (e.g., a consolidated or bonded mat of nanofiber composites). The fibrous mat, for example, may have a variety of basis weights. In accordance with certain embodiments of the invention, for example, the fibrous mat may have a basis weight from about 1 to about 100 grams-per-square meter (gsm), such as at least about any of the following: 1, 3, 5, 10, 15, 20, 25, 30, 35, 40, 45, and 50 gsm, and/or at most about any of the following: 100, 90, 80, 70, 60, and 50 gsm.

In another aspect, the invention provides a method of making a sorbent material, in which the method may comprise forming a spinning composition comprising a polymeric material and at least one at least one metal organic framework (MOF) material dispersed throughout the polymeric material. The method may further comprise a step of forming one or more nanofiber composites including the polymeric material defining a continuous phase and the least one (MOF) material defining a discontinuous phase dispersed throughout the continuous phase of the polymeric material. In accordance with certain embodiments of the invention, the step of forming one or more nanofiber composites may comprise electrospinning the spinning composition, meltspinning the spinning composition, or solution-spinning the spinning composition. In accordance with certain embodiments of the invention, the method may comprise forming a spinning composition that includes one or more organic solvents or an aqueous solvent. In this regard, the at least one MOF material may be dissolved in the spinning composition. Alternatively, the at least one MOF may be suspended within the spinning composition. In accordance with certain embodiments of the invention, the method may comprise forming a solution or melt of the polymeric material and adding the at least one MOF to the solution or melt, while providing agitation to facilitate dissolution and/or dispersion of the at least one MOF in the solution or melt.

In another aspect, the invention provides a water harvesting device including at least one adsorption column (e.g., a temperature swing adsorption (TSA) column and/or a pressure swing adsorption (PSA) column), in which the at least one adsorption column includes at least a first adsorption column including a first inlet, a first outlet, and a first interior region. The water harvesting device may also include a sorbent material located within the first interior region of the first adsorption column, in which the sorbent material comprises a plurality of nanofiber composites. The plurality of nanofiber composites may each comprise a polymeric material defining a continuous phase and at least one MOF material defining a discontinuous phase. In this regard, the at least one MOF material is dispersed throughout the continuous phase of the polymeric material. In accordance with certain embodiments of the invention, the water harvesting device may include a first absorption column may include one or more composite nanofibers and a second absorption column that may include one or more hydrogel-based porous nanofabrics (e.g., consolidated or non-consolidated mat of nanofibers that may be devoid of a MOF material), and/or one or more MOF materials provided separately. Additionally or alternatively, an absorption column may include the combination of one or more nanofiber composites, one or more MOF materials (e.g., separately from those embedded and/or dispersed within the nanofiber composites), and/or one or more hydrogel-based porous nanofabrics (e.g., consolidated or non-consolidated mat of nanofibers).

In accordance with certain embodiments of the invention, the water harvesting devices may include a combination of one or more nanofiber composites, one or more MOF materials, and/or one or more nanofabrics and/or nanofibers formed from the hydrogel materials (e.g., devoid of a MOF) disclosed and described herein, in which the water harvesting devices may extract water from both a low moisture content air (e.g., 4° C./50% RH and 27° C./10% RH, both contain about 2-4 g water/kg of air) and a high moisture content air (e.g., 43° C./60% RH with a water content of 37 g/kg air), respectively.

FIG. 1 illustrates a schematic of a water harvesting device 1 according to certain embodiments of the invention, in which the water harvesting device includes an adsorption column 10 housing a sorbent material 11 therein. Although FIG. 1 illustrates only a single adsorption column, a plurality of such adsorption columns are contemplated and illustrated below. Atmospheric air 3 may be pulled into the water harvesting device 1 via an air intake apparatus 20 (e.g., a fan 20) and conveyed into the adsorption column 10 through an incoming air flow valve 24 and inlet 12. Optionally and as shown on FIG. 1, the water harvesting device 1 may include a pre-filter 22 positioned between the air intake apparatus 20 and the air inlet of the water harvesting device. The airflow passes through the adsorption column 10 and exits the adsorption column through an outlet 14 where the airflow may be expelled out of the water harvesting device. In accordance with certain embodiments of the invention, the adsorption column captures or retains water from the airflow passing therethrough under a first set of operating conditions, and desorbs or releases water (e.g., liquid water) under a second set of operating conditions. During desorbing or releasing water under the second set of operating conditions, the water (e.g., liquid water) may exit the adsorption column via a liquid water outlet 16 and pass through valve 17 to a liquid water collection component 30 (e.g., water collection tank of vessel)

In accordance with certain embodiments of the invention, the adsorption column 10 may comprise a TSA column, in which the adsorption column operates as part of a temperature adsorption swing process. For instance, the adsorption column may capture or retain water from the airflow being conveyed through the adsorption column under a first set of operating conditions, such as including a first temperature, and desorb or release previously captured or retained water under a second set of operating conditions, such as including a second temperature that is greater than the first temperature. Accordingly, the water harvesting device 1 may also include a heat source 40 operatively connected to the adsorption column. The heat source 40 is not particularly limited, but may include a means of conveying a heated gas directly through the adsorption column (e.g., direct contact with the sorbent material 11) or indirectly through a jacket surrounding at least a portion of the adsorption column or heating tubes located within the adsorption column. Additionally or alternatively, the heat source may comprise an electrically powered heater. In accordance with certain embodiments of the invention, the adsorption column 10 may comprise a PSA column, in which the adsorption column operates as part of a pressure adsorption swing process. For instance, the adsorption column may capture or retain water from the airflow being conveyed through the adsorption column under a first set of operating conditions, such as including a first pressure, and desorb or release previously captured or retained water under a second set of operating conditions, such as including a second pressure that is lower than the first pressure. Accordingly, the water harvesting device 1 may also include a vacuum source 50 operatively connected to the adsorption column. The vacuum source 50 is not particularly limited, but may include a vacuum pump, a fan, steam ejector, or other device capable of reducing the pressure inside the adsorption column.

The term "temperature swing adsorption" (TSA), as used herein, refers to a process that relies on temperature differences and associated pressure differences for different operating conditions. For instance, under pressure and relatively moderate to low temperatures water in vapor form tends to be captured or retained within the sorbent materials. When the temperature of the sorbent material is increased, the captured or retained water is released, or desorbed. By cyclically swinging the temperature of adsorption columns including the sorbent material, TSA processes can be used to harvest or pull water from an ambient or atmospheric air when used with an sorbent materials having affinity for water.

The term "pressure swing adsorption" (PSA), as used herein, refers to a process used to separate a gas species (e.g., water) from a mixture of gases (e.g., air) under pressure according to the species' (e.g., water) molecular characteristics and affinity for a sorbent material. A PSA process may operate at near-ambient temperatures and differs significantly from cryogenic distillation techniques of gas separation. Many PSA processes operate partially at pressures below atmospheric and are described in the art as vacuum swing adsorption (VSA) or pressure-vacuum swing adsorption (PVSA) processes. In the present specification, PSA is used as a generic term to describe all types of cyclic adsorption systems regardless of operating pressure levels. In PSA processes, the sorbent material captures or retains a gas species (e.g., water) under a first pressure and releases or desorbs the previously captured gas species (e.g., water) under a second pressure that is less than the first pressure.

Certain embodiments according to the invention provide a water harvesting device including at least one adsorption column (e.g., a temperature swing adsorption (TSA) column and/or a pressure swing adsorption (PSA) column), in which the at least one adsorption column includes at least a first adsorption column including a first inlet, a first outlet, and a first interior region. The water harvesting device may also include a sorbent material located within the first interior region of the first adsorption column, in which the sorbent material comprises (a) one or more nanofiber composites, (b) a porous media comprising a MOF material including a plurality of metal ions or clusters of metal ions coordinated to one or more organic linkers, (c) a hydrogel-based nanofabric material (e.g., with our without an MOF dispersed therein), or (d) and combination of (a), (b), and (c).

Figure 2A:
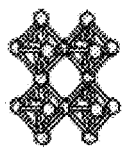
FIG. 2A illustrates a generic structure for a metal-organic framework (MOF) according to certain embodiments of the invention.
Figure 2B:
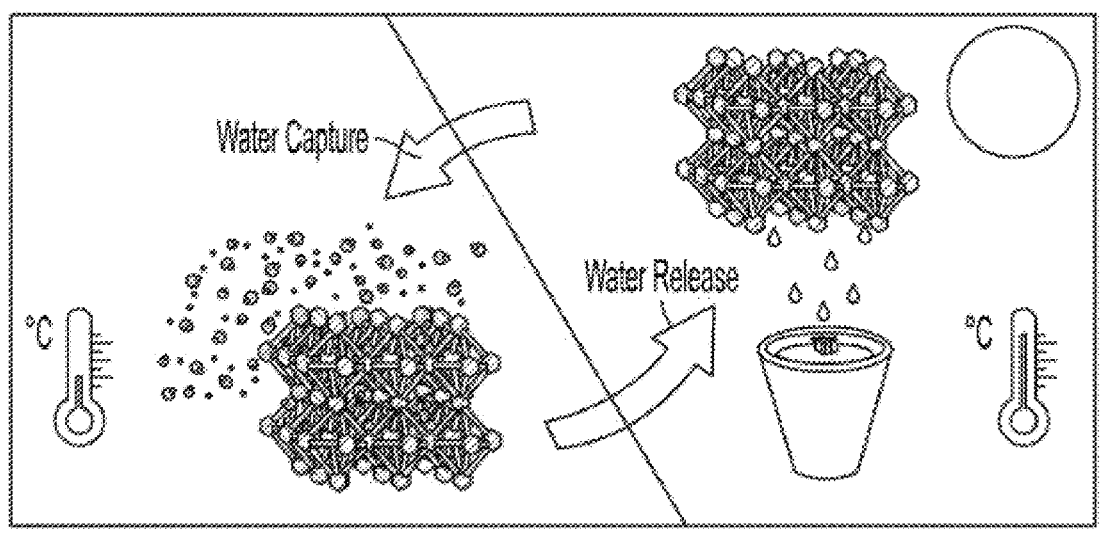
FIG. 2B illustrates a general cycle of water capture from atmospheric air by a MOF material at a first temperature and release of the water at a temperature higher than the first temperature according to certain embodiments of the invention.
Figure 2C:
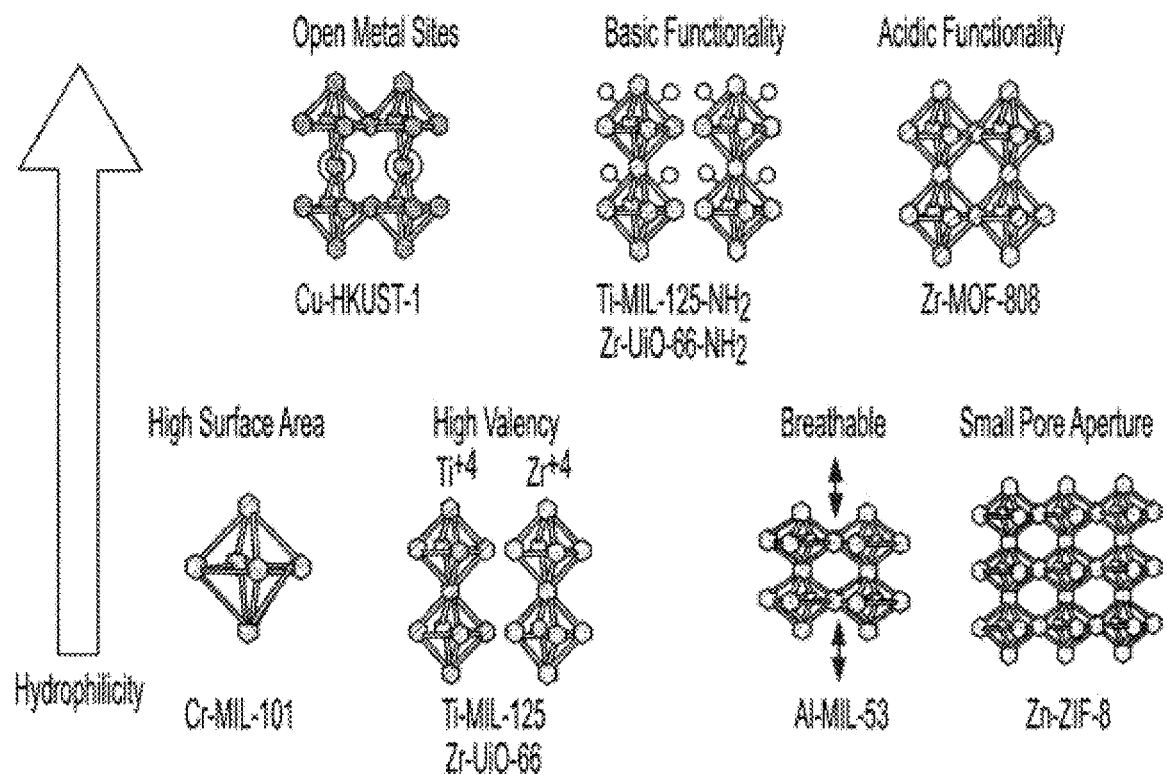
FIG. 2C illustrates structures of various MOF materials in accordance with certain embodiments of the invention.

In accordance with certain embodiments of the invention the MOF material has a generally porous structure. For instance, the MOF material may include a plurality of pores defined by the plurality of metal ions or clusters of metal ions that are coordinated with one or more organic linkers as generally illustrated by FIG. 2A. FIG. 2B illustrates a general cycle of water capture from atmospheric air by a MOF material at a first temperature and release of the water at a temperature higher than the first temperature according to certain embodiments of the invention. As noted above and generally illustrated by FIG. 2B, the MOF material attracts and/or retains (e.g., adsorbs) water at a first temperature and/or a first pressure, and releases water at a second temperature and/or pressure; wherein the first temperature is less than the second temperature and/or the first pressure is larger than the second pressure. FIG. 2C illustrates structures of various MOF materials in accordance with certain embodiments of the invention, in which the different structures provide differing porosities, functionalities, and hydrophilicity.

Figure 3:
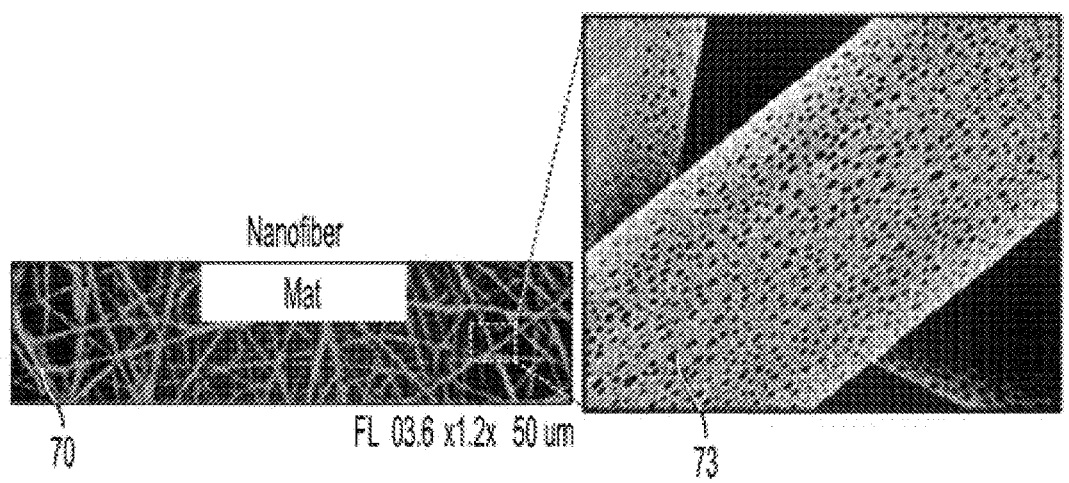
FIG. 3 shows a mat of a plurality of nanofibers including a magnified view of a nanofiber of the mat that illustrates the porous surface area of the nanofibers in accordance with certain embodiments of the invention.

As referenced above, the sorbent material may comprise a hydrogel material provided in the form of nanofibers (e.g., including or being devoid of a MOF dispersed therein). In accordance with certain embodiments of the invention, the nanofibers (or nanofabrics) may be made, for example, by electospinning a hydrogel material (e.g., in a flowable form). The hydrogel-based nanofibers may include macropores, micropores, and/or nano-scaled pores that provide the nanofibers with particularly large surface areas. As such, the nanofibers may be advantageous for atmospheric water extraction applications in accordance with certain embodiments of the invention. The increased porosity of the nanofibers, for example, provide overall diffusion kinetics that may be further enhanced. FIG. 3, for instance, shows a mat of a plurality of nanofibers 70 including a magnified view of a nanofiber of the mat that illustrates the porous surface area of the nanofibers including a plurality of pores or pits 73 formed in the surface of the nanofibers in accordance with certain embodiments of the invention.

By way of example only, a hydrogel material may be synthesized for harvesting water from air. Synthesis of super absorbing hydrogels, for example, may be made of imidazolium-derived ionomers copolymerized onto a poly(NIPAM) network. Such hydrogels, for example, may then be subjected to electrospinning to form porous nanofibers (e.g., hydrogel-based nanofibers). In accordance with certain embodiments of the invention, imidazolium ionomers are a desirable target since ionic liquids such as 1-ethyl-3-methylimidazolium acetate (EMIM-Ac) perform well as a sorbent, even at relatively low (20%) relative humidity. As noted above, the nanofibers comprising a hydrogel material completely eliminates the need for large amounts of lithium salts. In accordance with certain embodiments of the invention, for example, the nanofibers comprising (or consisting) of the hydrogel material may be devoid of lithium salts.

By way of example only, a hydrogel material may be synthesized from imidazolium-derived ionomers as the water adsorbing units with vinylimidazoles as illustrated in Schematic 2. These imidazolium ionomers are easily synthesizable and structurally modular, which allows for quick access. Notably, the addition of anionic carboxylates improves the sorption of moisture, in accordance with certain embodiments of the invention, thus increasing the volume and rate of moisture collected without the need of lithium salts. Lastly these example ionomers can be co-polymerized with poly(N-isopropylacrylamide) (NIPAM) to utilize the thermally-activated water-release actuation of poly(NIPAM). With a Lower Critical Solution Temperature (LCST) of 32° C. and a high swell ratio, poly(NIPAM) is an ideal matrix hydrogel in accordance with certain embodiments of the invention.

Schematic 2

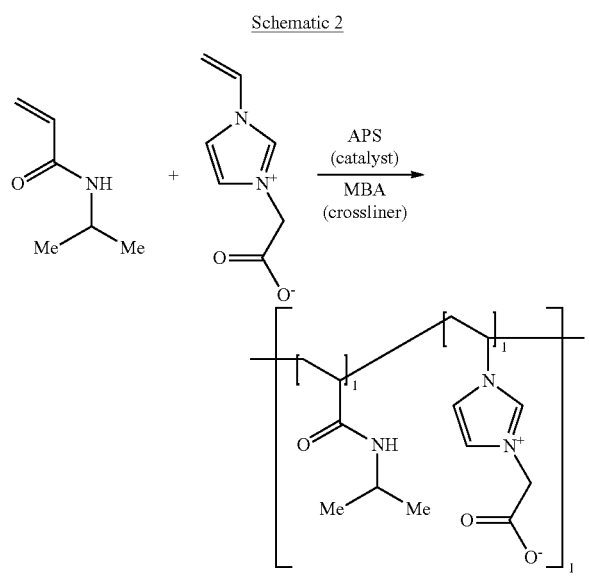

In accordance with certain embodiments of the invention, the plurality of nanofibers may comprise a hydrogel material, as noted above, and the plurality of nanofibers may have an average diameter from about 0.5 nm to about 5000 nm, such as at least about nay any of the following: 0.5, 1, 5, 10, 20, 30, 40, 50, 60, 70, 80, 90, 100, 125, 150, 175, 200, 300, 400, and 500 nm, and/or at most about any of the following: 5000, 4500, 4000, 3500, 3000, 2500, 2000, 1500, 1000, 900, 800, 700, 600, and 500 nm. The plurality of nanofibers, for example, may comprise continuous fibers, discontinuous fibers, or a combination thereof. In accordance with certain embodiments of the invention, the plurality of nanofibers may be provided in a non-consolidated format (e.g., loosely laid fibers that are not physically entangled or otherwise bonded to form a fabric), provided as a woven fabric, or provided as a non-woven fabric. Additionally or alternatively, the plurality of nanofibers may comprise electrospun, melt spun, and/or solution spun fibers.

In accordance with certain embodiments of the invention, the plurality of hydrogel nanofiber (e.g., including or being devoid of a MOF dispersed therein) may include discontinuous fibers (e.g., staple fibers) having an average length from about 5 centimeters (cm) to about 500 cm, such as at least about any of the following: 5, 10, 25, 50, 75, 100, 125, 150, 175, 200, 225, and 250 cm, and/or at most about any of the following: 500, 450, 400, 350, 300, and 250 cm.

In accordance with certain embodiments of the invention, and as noted above, at least a portion of the plurality of nanofibers (e.g., including or being devoid of a MOF dispersed therein) may include a plurality of pores (or effective pores) along a respective surface, throughout a respective thickness, or a combination thereof. The plurality of pores (or effective pores), for example, may comprise an average diameter from about 0.5 to about 1000 nm, such as at least about any of the following: 0.5, 1, 5, 10, 20, 40, 50, 60, 80, 100, 120, 140, 150, 200, 225, 250, 275, 300, 350, 400, 450, and 500 nm, and/or at most about any of the following: 1000, 900, 800, 700, 600, and 500 nm.

In accordance with certain embodiments of the invention, the plurality of nanofibers (e.g., including or being devoid of a MOF dispersed therein) may have an average surface area from 500 g/m² to 5000 g/m², such as at least about any of the following: 500, 600, 800, 1000, 1500, 2000, and 2500 g/m², and/or at most about any of the following: 5000, 4500, 4000, 3500, 3000, and 2500 g/m².

The plurality of nanofibers (e.g., including or being devoid of a MOF dispersed therein) may, in accordance with certain embodiments of the invention, may have a water uptake capacity from about 0.1 to about 10 grams (g) of water per gram of the plurality of nanofibers(e.g., including or being devoid of a MOF dispersed therein), such as at least about any of the following: 0.1, 0.3, 0.5, 0.7, 1, 1, 1.5, 2, 2.5, 3, 3.5, 4, 4.5, and 5 grams of water per grams of the plurality of nanofibers, and/or at most about any of the following: 10, 9.5, 9, 8.5, 8, 7.5, 7, 6.5, 6, 5.5, and 5 grams of water per grams of the plurality of nanofibers. Additionally or alternatively, the plurality of nanofibers may have a working capacity from 0.1 to 50 grams of water per gram of the plurality of nanofibers, such as at least about any of the following: 0.1, 1, 3, 5, 8, 10, 12, 15, 18, 20, 22, and 25 grams of water per gram of the plurality of nanofibers, and/or at most about any of the following: 50, 48, 45, 42, 40, 38, 35, 32, 30, 28, and 25 grams of water per gram of the plurality of nanofibers.

In accordance with certain embodiments of the invention, the hydrogel material may comprise a polyvinyl alcohol functionality, a polyethylene glycol functionality, an acrylate functionality, imidazole or imidazolium functionality, N-vinyl imidazole and derivatives thereof, an ionomer, collagen, gelatin, fibrin, or any combination thereof. Additionally or alternatively, the hydrogel material includes poly(ethylene glycol) functionality, poly(vinyl alcohol) functionality, polyacrylamide functionality, polyglutamic acid functionality, acrylates, methacrylate, or any combinations thereof. Additionally or alternatively, the hydrogel material comprises a copolymer of an acrylamide functional monomer and an imidazolium functional ionomer with an optional diacrylamide crosslinker, such as but not limited to N,N'-Methylenebisacrylamide. Additionally or alternatively, the hydrogel material may comprise one or more deliquescent salts, such as $CaCl_2$ or LiCl or both. In accordance with certain embodiments of the invention, the hydrogel material may be devoid of one or more deliquescent salts.

As noted above, the plurality of nanofiber composite and/or hydrogel nanofibers (e.g., including or being devoid of a MOF dispersed therein) may attract and/or retain (e.g., adsorbs) water from air at a first temperature and/or a first pressure, and releases water at a second temperature and/or pressure, in which the first temperature is less than the second temperature and/or the first pressure is larger than the second pressure.

In accordance with certain embodiments of the invention, the polymeric material and/or the hydrogel material may have a desorption temperature of at least about (e.g., temperature at which the material releases previously captured water) of at least about 20° C., such as at least about any of the following: 20, 22, 25, 28, 30, 40, 50, 60, 70, 80, 90, 100, and 120° C., and/or at most about any of the following: 200, 180, 160, 150, 140, and 120° C.

In accordance with certain embodiments of the invention, the sorbent material may comprise a particulate-composite material (PCM) comprising (i) a binder material and (ii) the MOF and/or the plurality of nanofibers. The binder material, for example, may comprise a natural polymeric material, a synthetic polymeric materials, a wax, or any combination thereof. Additionally or alternatively, the binder material may comprise a homopolymer comprising, for example, polyvinylidene fluoride (PVDF), carboxymethyl cellulose (CMC), polyvinyl alcohol (PVA), poly(acrylic acid) (PAA), silicone based resins, or combinations thereof. Additionally or alternatively, the binder material may comprise a copolymer comprising a styrene-butadiene rubber (SBR), acrylics, methacrylic, maleic, or itaconic acid as a comonomer. Additionally or alternatively, the binder material may comprise both a linear and a three-dimensional crosslinked polymer.

In accordance with certain embodiments of the invention, the PCM may have an average diameter from about 1 mm to about 10 mm, such as at least about any of the following: 1, 2, 3, 4, 5, and 6 mm, and/or at most about any of the following: 10, 9, 8, 7, and 6 mm.

In accordance with certain embodiments of the invention, the PCM may have a binder-to-sorbent ratio (grams of binder/grams of sorbent) of from 1:10 to 10:1, such as at least about any of the following: 1:10, 2:10, 3:10, 4:10, 5:10, 6:10, 7:10, 8:10, 9:10, and 1:1, and/or at most about any of the following: 10:1, 9:1, 8:1, 7:1, 6:1, 5:1, 4:1, 3:1, 2:1, and 1:1.

In accordance with certain embodiments of the invention, the PCM may include a surface having a first concentration of the sorbent material and a central body portion having a second concentration of the sorbent material, wherein the central body portion is surrounded by the surface and the first concentration is greater than the second concentration. Additionally or alternatively, the PCM may have a bulk density from 0.05 to about 2 $g/cm^3$, such as at least about any of the following: 0.05, 0.08, 0.1, 0.2, 0.4, 0.5, 0.6, 0.8 and 1 $g/cm^3$, and/or at most about any of the following: 2, 1.8, 1.6, 1.5, 1.4, 1.2, and 1 $g/cm^3$.

In accordance with certain embodiments of the invention, the sorbent material may include one or more nanofiber composites, one or more MOF materials, one or more hydrogel-based nanofibers (including or being devoid of a MOF dispersed therein), and/or a PCM that may be packed within one or more adsorption columns. For example, a first adsorption column may include one or more MOF materials (alone or as part of a PCM) and a second adsorption column may include one or more nanofiber composites. Additionally or alternatively, an adsorption column may include the combination of one or more nanofiber composites and one or more hydrogel-based nanofibers (alone or as part of a PCM). As described in more detail below, water harvesting devices in accordance with certain embodiments of the invention may include a first set of adsorption columns including one or more MOF materials for extracting water from low moisture air and a second set of adsorption columns including hydrogel-based nanofibers for extracting water from high moisture air. For example, once the atmospheric moisture is concentrated to a high moisture level during the TSA process or PSA process, the humid air may then brought into contact with a condenser (e.g., a thermoelectric Peltier device) for water collection. A superhydrophobic coating (contact angle)>150° may be applied to the condensing side of the Peltier device, facilitating the coalescing and sliding of water droplets leading to high water collection efficiency In accordance with certain embodiments of the invention, the water harvesting device may include at least a first TSA or PSA column and a second TSA or PSA column, in which the first adsorption column (e.g., TSA or PSA column) includes a first inlet, a first outlet, and a first interior region, in which the first interior region houses, for example, one or more MOF materials. The second adsorption column (e.g., TSA or PSA column) includes a second inlet, a second outlet, and a second interior region, in which the second interior region houses, for example, one or more plurality of nanofibers. The water harvesting device itself may include an air inlet and an air outlet, in which the air inlet may be selectively and operatively coupled to both the first inlet and the second inlet, and the air outlet being selectively and operatively coupled to both the first outlet and the second outlet. In accordance with certain embodiments of the invention, the water harvesting device may include at least one incoming airflow valve located between the first and second adsorption columns and the air inlet, in which the at least one incoming airflow valve may be configured to allow ambient air from an environment into the first adsorption column and/or the second adsorption column. The at least one incoming airflow valve may comprises a three-way valve. Additionally or alternatively, the at least one incoming airflow valve may include a first incoming airflow valve located between the first adsorption column and the air inlet and a second incoming airflow valve located between the second adsorption column and the air inlet of the water harvesting device.

In accordance with certain embodiments of the invention, the water harvesting device may include an air intake apparatus (e.g., a fan) located between and operatively connected to the air inlet of the water harvesting device and the at least one incoming airflow valve. The water harvesting device may also include at least one exiting airflow valve located between the first and second adsorption columns and the air outlet of the water harvesting device, in which the at least one exiting airflow valve may be configured to allow removal of air from the first and/or second adsorption columns to the environment. In accordance with certain embodiments of the invention, the at least one exiting airflow valve may comprise a three-way valve. Additionally or alternatively, the at least one exiting airflow valve may include a first exiting airflow valve located between the first adsorption column and the air outlet of the water harvesting device and a second exiting airflow valve located between the second adsorption column and the air outlet of the water harvesting device.

Figure 4:
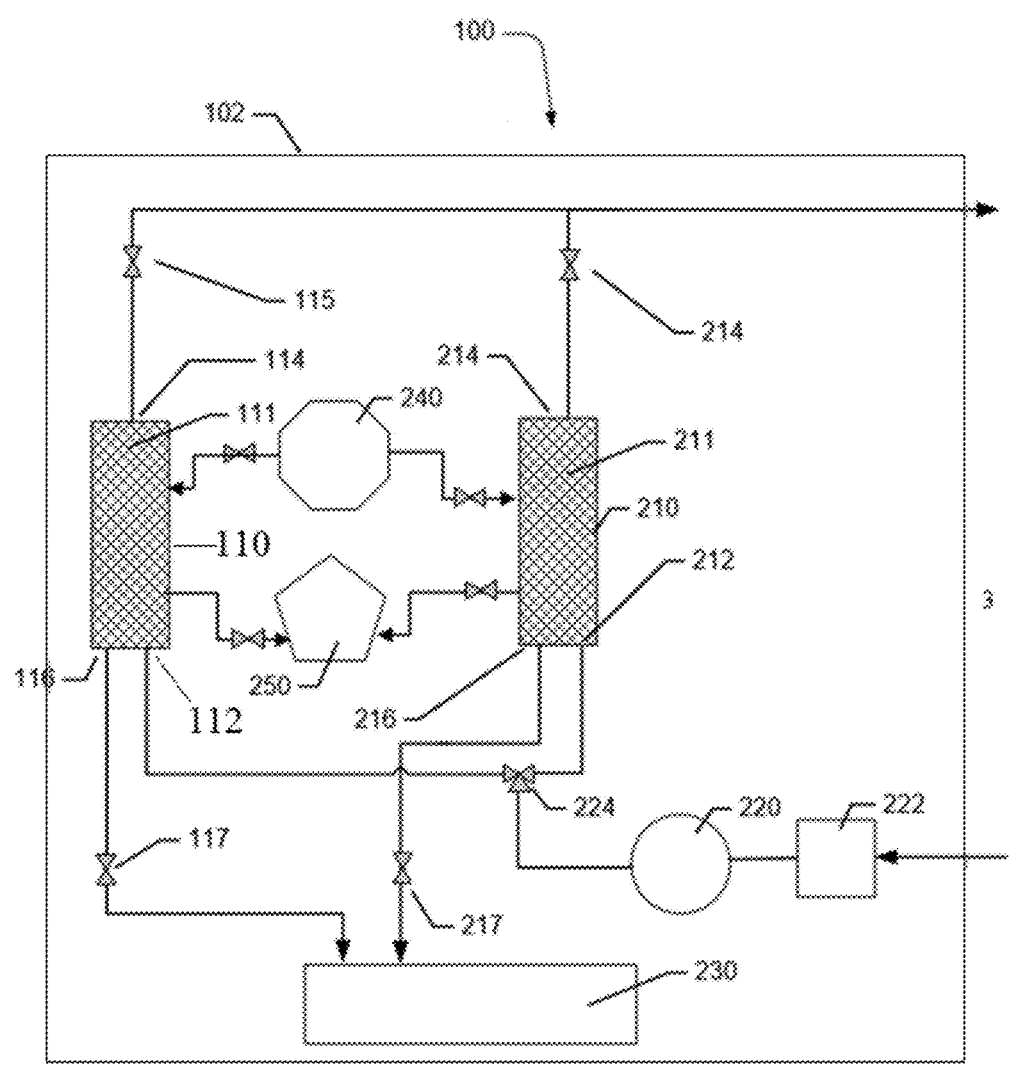
FIG. 4 illustrates a water harvesting device including a plurality of absorption columns, in which a first absorption column can be capturing water from air while a second absorption column can be releasing previously captured water in accordance with certain embodiments of the invention.

FIG. 4, for example, illustrates a water harvesting device including a plurality of absorption columns (e.g., TSA or PSA columns), in which a first absorption column can be capturing water from air while a second absorption column can be releasing previously captured water in accordance with certain embodiments of the invention. The water harvesting device 100 of FIG. 4 includes an outer housing 102 in which the adsorption columns 110, 210 and other items are housed. Atmospheric air 3 may be pulled into the water harvesting device 100 via an air intake apparatus 220 (e.g., a fan 220) and conveyed into a first adsorption column 110 through an incoming air flow valve 224 (e.g., a three-way valve such that incoming air can be directed to either adsorption column) and inlet 112. Optionally and as shown on FIG. 4, the water harvesting device 100 may include a pre-filter 222 positioned between the air intake apparatus 220 and the air inlet of the water harvesting device. The airflow passes through the first adsorption column 110, which includes a first sorbent material 111 therein, and exits the first adsorption column through an outlet 114 where the airflow may be expelled out of the water harvesting device via valve 115. In accordance with certain embodiments of the invention, the first adsorption column captures or retains water from the airflow passing therethrough under a first set of operating conditions, while the second adsorption device operates under a second set of operating conditions to desorb or releases water (e.g., liquid water and/or high humidity air). In this regard, the adsorption columns 110, 210 may be either TSA columns or PSA columns. Accordingly, each adsorption column is operatively connected to a heat source 240 for TSA columns and/or a vacuum source 250 for PSA columns. The second adsorption column, which includes a second sorbent material 211 therein, also includes an air inlet 212 and an air outlet (valve) 214 whereby the airflow that has passed through the second adsorption column may be expelled out of the water harvesting device via valve 214. In accordance with certain embodiments of the invention, the second adsorption column 210 may be in an operational state of desorbing while the first adsorption column is an operational state of adsorbing water. In this regard, the water (e.g., liquid or high humidity air) being released from the second sorbent material 211 may exit the second adsorption column via water outlet 216 and pass directly or indirectly into a liquid water collection component 230. In this regard, a valve 217 may be located between liquid water collection component 230 and the water outlet 216.

In accordance with certain embodiments of the invention, the water harvesting device may include a piping network and/or a valve network that may be selectively controlled to pass ambient air from the environment through a first adsorption column only, a second adsorption column only, both a first adsorption column and a second adsorption column in parallel, or both a first adsorption column and then a second adsorption column in series. For example, the water harvesting device may comprise a device airflow path from the air inlet of the water harvesting device, into and through a first adsorption column, into and through a second adsorption column, and out the air outlet of the water harvesting device to provide a series configuration. In accordance with certain embodiments of the invention, the at least one adsorption column includes at least a first adsorption column and a second adsorption column, in which each adsorption column includes a respective inlet, a respective outlet, and a respective interior region. For instance, the first adsorption column may include a first interior region and the second adsorption column may include second interior region in which each interior regions include one or more nanofiber composites, one or more MOF materials, a plurality of hydrogel-based nanofibers, PCMs, or any combination thereof. In this regard, the water harvesting device may include an air inlet and an air outlet, in which the air inlet may be selectively and operatively coupled to both the first inlet and the second inlet, and the air outlet may be selectively and operatively coupled to both the first outlet and the second outlet. For example, the water harvesting device may include at least one incoming airflow valve located between the first and second adsorption columns and the air inlet, in which the at least one incoming airflow valve being configured to allow ambient air from an environment into the first adsorption column and/or the second adsorption column. In accordance with certain embodiments of the invention, the at least one incoming airflow valve comprises a three-way valve. Additionally or alternatively, the at least one incoming airflow valve includes a first incoming airflow valve located between the first adsorption column and the air inlet and a second incoming airflow valve located between the second adsorption column and the air inlet. The water harvesting device may also include an air intake apparatus located between and operatively connected to the air inlet and the at least one incoming airflow valve. The water harvesting device may also include at least one exiting airflow valve located between the first and second adsorption columns and the air outlet, in which the at least one exiting airflow valve may be configured to allow removal of air from the first and/or second adsorption columns to the environment. In accordance with certain embodiments of the invention, the at least one exiting airflow valve comprises a three-way valve. Additionally or alternatively, the at least one exiting airflow valve includes a first exiting airflow valve located between the first TSA column and the air outlet and a second exiting airflow valve located between the second TSA column and the air outlet. In accordance with certain embodiments of the invention, the water harvesting device may include a valve network that allows for selective directional control of ambient air from the environment to pass through the first adsorption column only, the second adsorption column only, both the first adsorption column and the second adsorption column in parallel, or both the first adsorption column and the second adsorption column in series.

Figure 5A:
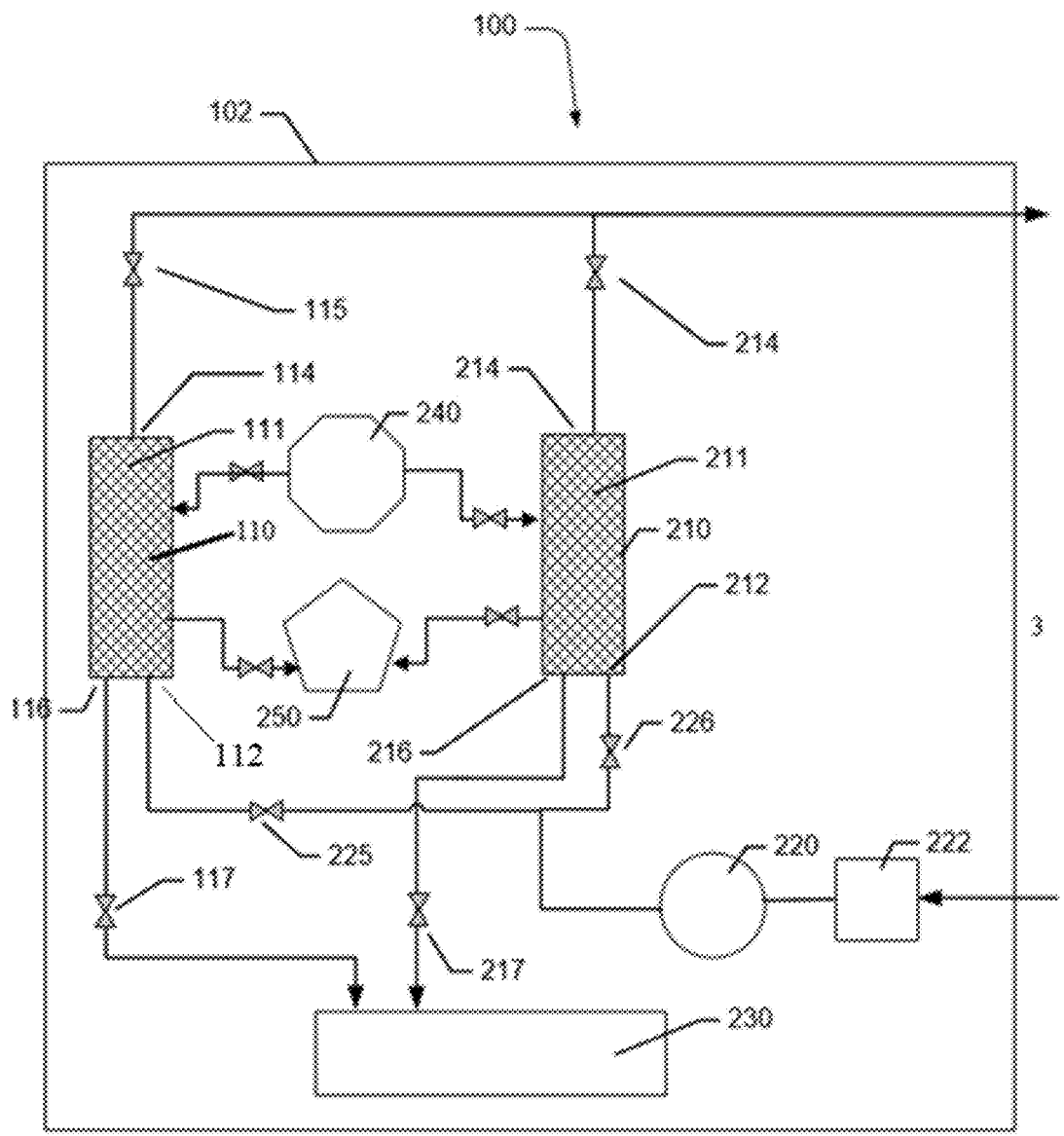
FIG. 5A illustrates a water harvesting device configured with absorption columns that may be operated in parallel (e.g., each adsorption column captures water at the same time and/or releases previously captured water at the same time), or one adsorption column may be operated in a different state than another adsorption column (e.g., a first adsorption column may be actively capturing water from air while a second adsorption column may be desorbing water or be shut down) in accordance with certain embodiments of the invention.

FIG. 5A, for example, illustrates a water harvesting device configured with absorption columns that may be operated in parallel (e.g., each adsorption column captures water at the same time and/or releases previously captured water at the same time), or one adsorption column may be operated in a different state than another adsorption column (e.g., a first adsorption column may be actively capturing water from air while a second adsorption column may be desorbing water or be shut down) in accordance with certain embodiments of the invention. In this regard, the water harvesting device illustrated by FIG. 5A includes a first inlet valve 225 to the first adsorption column 110 and a second inlet valve 226 to the second adsorption column 210, in which these valves may be controlled in a manner to direct incoming airflow to both adsorption columns at the same time (e.g., parallel operation) or to only one adsorption column for water harvesting while the other adsorption column operates in a desorbing state in which previously retained or capture water may be released from the sorbent material and directed into the liquid water collection component 230. In this regard, water being desorbed from the first sorbent material 111 from the first adsorption column 110 may exit the first adsorption column via water outlet 116 while valve 117 may be opened to allow passage of the released water to the liquid water collection component 230. In a similar manner, water being desorbed from the second sorbent material 211 from the second adsorption column 210 may exit the second adsorption column via water outlet 216 while valve 217 may be opened to allow passage of the released water to the liquid water collection component 230.

Figure 5B:
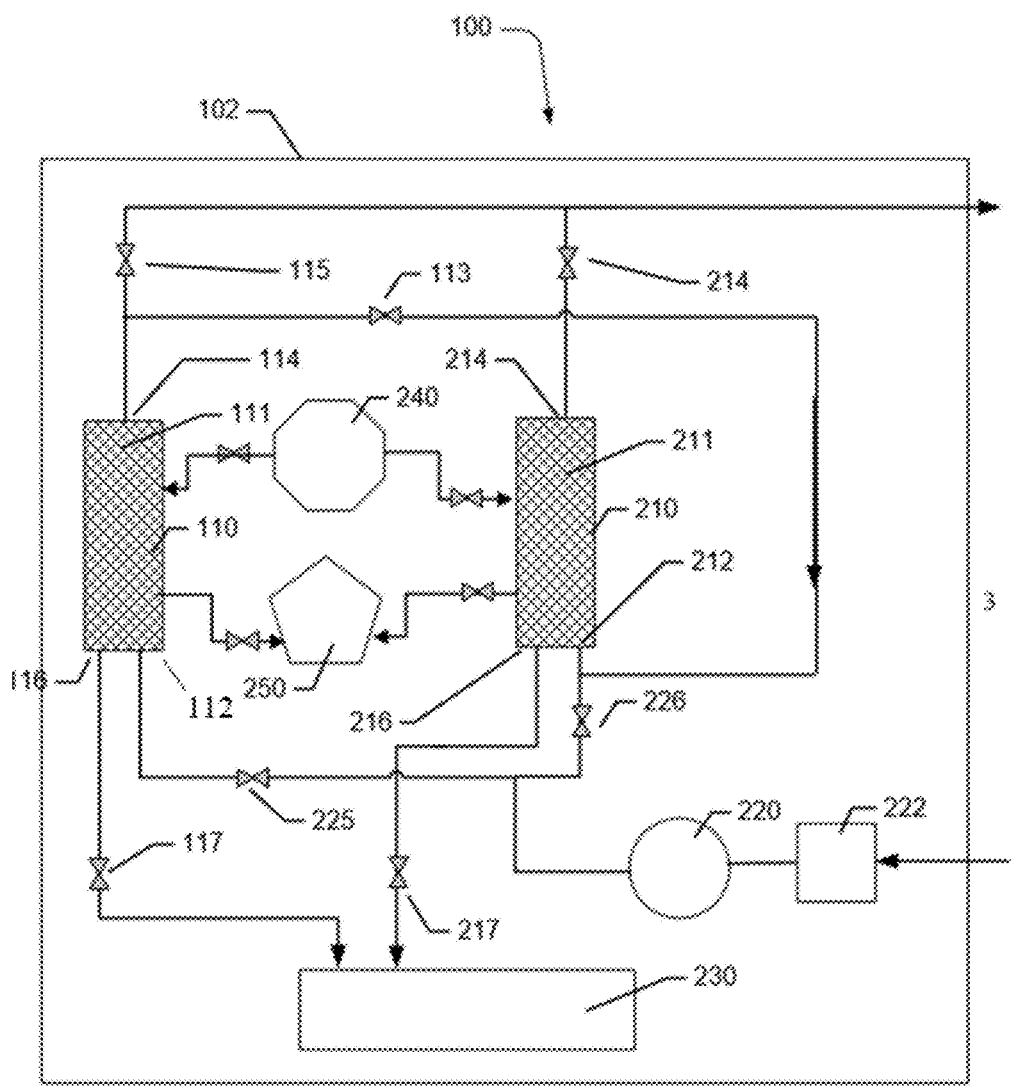
FIG. 5B illustrates a water harvesting device similar to FIG. 5A, but also includes a configuration to enable series operation of the adsorption columns (e.g., incoming air may pass through a first adsorption column, then to a second adsorption column, and then exit the device) in accordance with certain embodiments of the invention.

FIG. 5B, for example, illustrates a water harvesting device similar to FIG. 5A, but also includes a configuration to enable series operation of the adsorption columns (e.g., incoming air may pass through a first adsorption column, then to a second adsorption column, and then exit the device) in accordance with certain embodiments of the invention. In this regard, the water harvesting device 100 illustrated by FIG. 5B includes a configuration in which incoming air is passed through the first inlet valve 225, into the first adsorption column 110, and exits the first adsorption column via outlet 114. Valve 113 may be opened while valve 115 is remained in a closed position to channel the airflow into the air inlet 212 of the second adsorption column 210. The airflow may pass through the second adsorption column 210, exits via air outlet (valve) 214, and expelled from the water harvesting device by opening valve 214. In accordance with certain embodiments of the invention, the first sorbent material may comprise a plurality of hydrogel-based nanofibers and the second sorbent material may comprise one or more MOF materials.

As noted above, the adsorption columns in the water harvesting device may be operatively connected to a heating source (e.g., a heater device) configured to directly or indirectly supply heat to the at least one TSA column. For example, the heating source may be operatively and independently connected to the first TSA column and the second TSA column, such that the heating source can provide heat to the first TSA column to initiate and/or perform a desorption process for the first TSA column while the second TSA column actively captures water from an air source (e.g., an adsorption operating state). Additionally or alternatively, the adsorption columns may be operatively connected to a vacuum source configured to reduce the pressure of the interior region of PSA columns. For example, the vacuum source may be operatively and independently connected to the first PSA column and the second PSA column, such that the vacuum source can reduce the pressure within the first PSA column to initiate and/or perform a desorption process for the first PSA column while the second PSA column actively captures water from an air source (e.g., an adsorption operating state).

In accordance with certain embodiments of the invention, the water harvesting device may include a desorption fluid removal apparatus independently and operatively connected to the first adsorption column and the second adsorption column. The desorption fluid removal apparatus may be located between (i) a respective liquid water outlet of the first adsorption column and the second adsorption column and (ii) a liquid water collection component. The desorption fluid removal apparatus may comprise a condenser located between the water outlets of the adsorption columns and the liquid water collection component. In accordance with certain embodiments of the invention, the water harvesting device may include a UV source oriented to expose any liquid water located in the liquid water collection component to UV light and purifying any liquid water collected. In accordance with certain embodiments of the invention, the water harvesting device may include at least one power source. For example, the at least one power source may be operatively connected to one or more of the air intake apparatus, the desorption fluid removal apparatus (e.g., a fan), the at least one heating apparatus, the at least one vacuum source, and the UV source.

Figure 6:
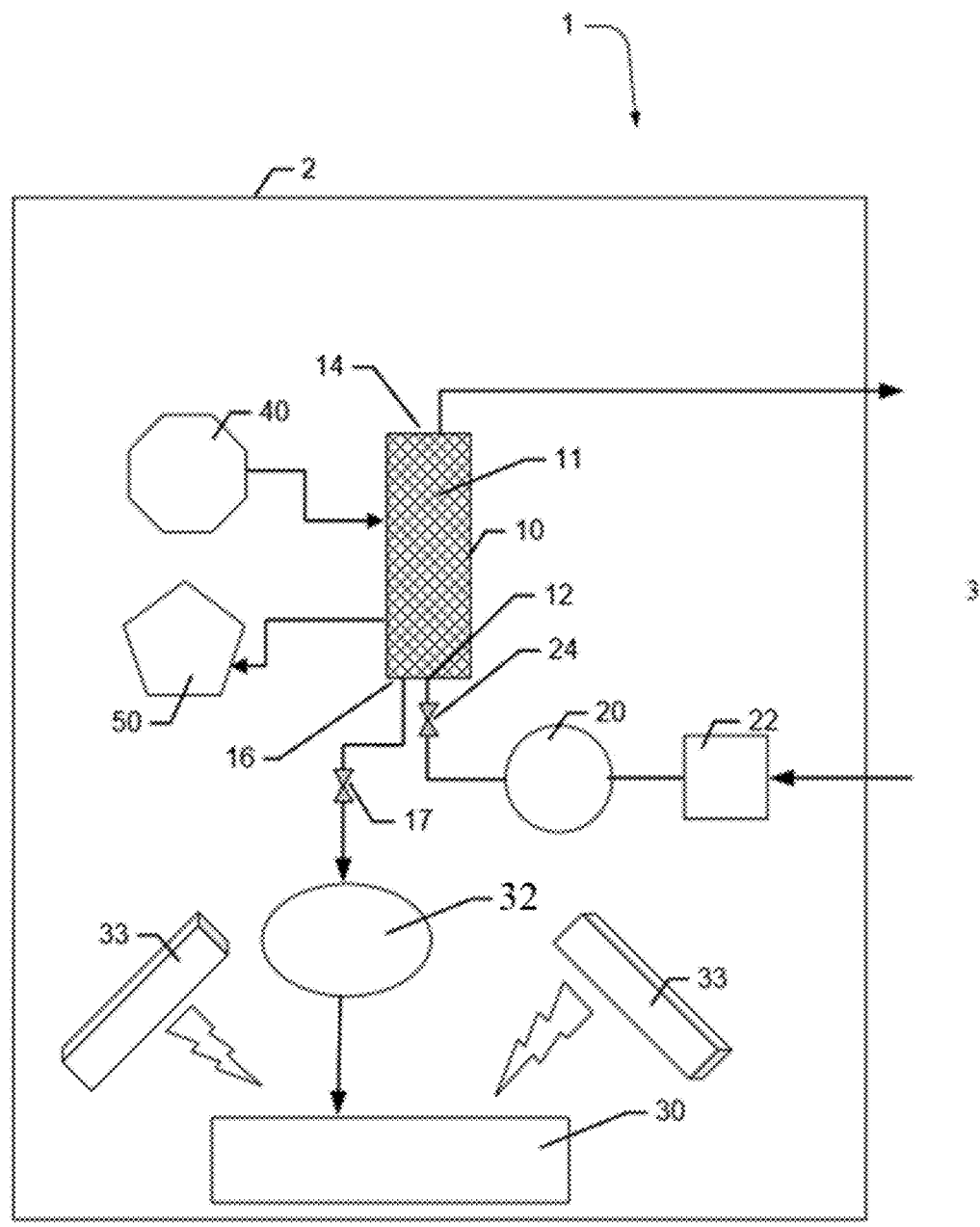
FIG. 6 illustrates a water harvesting device including a condenser and ultraviolet emitting devices in accordance with certain embodiments of the invention.

FIG. 6, for instance, illustrates a water harvesting device including a condenser 32 and ultraviolet emitting devices 33 in accordance with certain embodiments of the invention. Although FIG. 6 illustrates these components in combination with a single adsorption column, a plurality of adsorption columns may be operatively connected to one or more condensers that direct water to one or more liquid water collection components.

In accordance with certain embodiments of the invention, the water harvesting device may include a first sub-system comprising a first plurality of adsorption columns and a second sub-system including a second plurality of adsorption columns. For instance, the first sub-system may include a first adsorption column and a second adsorption column while the second sub-system may comprise a third adsorption column and a forth adsorption column. In accordance with certain embodiments of the invention, the first adsorption column and the second adsorption column may each include one or more MOF materials and/or one or more nanofiber composites, and the third adsorption column and the fourth adsorption column may each include a plurality of hydrogel-based nanofibers (e.g., including or being devoid of a MOF material). The water harvesting device may include a system network of valves that allows for selective directional control of ambient air from the environment to pass through the first sub-system and/or the second sub-system. For instance, the first sub-system may be selected for operation in more arid environments, while the second sub-system may be selected for operation in more humid environments. In this regard, the water harvesting device may include a user interface configured to initiate operation of the first sub-system or the second sub-system. Alternatively, the water harvesting device may include the first sub-system in which the first adsorption column includes a plurality of hydrogel-based nanofibers and/or one or more nanofiber composites and the second adsorption column includes one or more MOF materials and/or one or more nanofiber composites. Additionally, the second sub-system may include a third adsorption column having a plurality of hydrogel-based nanofibers and/or one or more nanofiber composites and a fourth adsorption column including one or more MOF materials and/or one or more nanofiber composites. In this regard, each of the sub-systems may be operated independently from the other. The plurality of adsorption columns within each sub-system may be configured to operate in parallel or series operation. When configured in parallel operation, the adsorption columns may include the same type of sorbent material (e.g., all include one or more nanofiber composites, all include one or more MOF materials, or all including one or more hydrogel-based nanofibers), while when in series operation the first adsorption column may include one or more hydrogel-based nanofibers and/or one or more nanofiber composites and the second adsorption column may include one or more MOF materials and/or one or more nanofiber composites.

Figure 7:
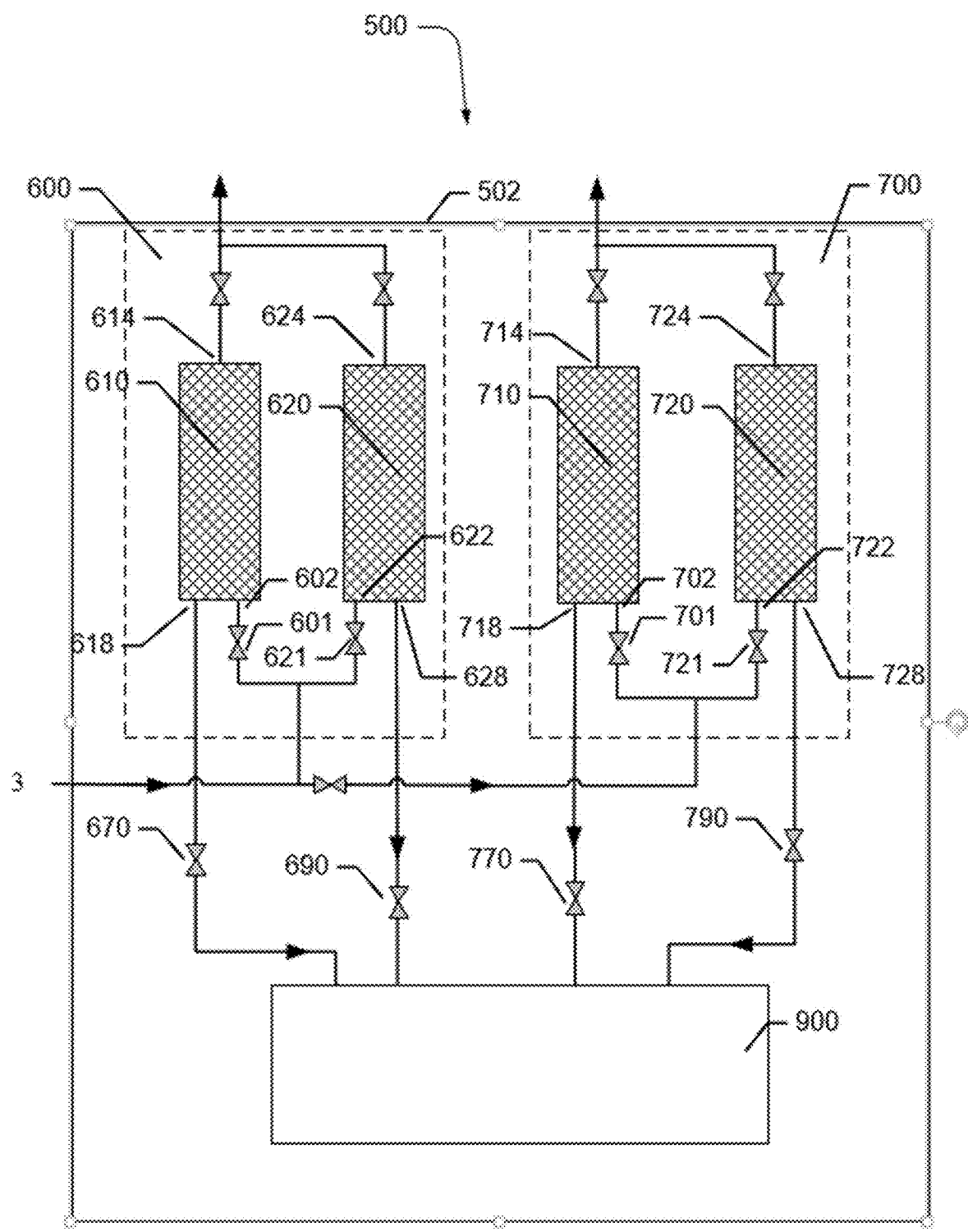
FIG. 7 illustrates a water harvesting device including a plurality of sub-systems, in which each sub-system includes a plurality of absorption columns that may be operated in parallel, that may be operated in parallel or one sub-system may be actively capturing water while another sub-system may be desorbing previously captured water in accordance with certain embodiments of the invention.

FIG. 7 illustrates a water harvesting device 500 including a plurality of sub-systems including a first sub-system 600 and a second sub-system 700, in which each sub-system includes a plurality of absorption columns that may be operated in parallel. For example, adsorption chambers 610, 620 of the first sub-system may be operated in a water capturing or retaining operational state, while the second sub-system's 700 adsorption columns 710, 720 are operated in a desorption operation state in which previously captured water is released. As illustrated in FIG. 7, the water harvesting device 500 may include an outer housing 502 that contains the sub-systems therein. Atmospheric air 3 is pulled into the water harvesting device (as previously noted) and may be directed to the first sub-system 600. The opening of valves 601, 621 allow airflow into the first adsorption chamber 610, which includes a first sorbent material, and the second adsorption chamber 620, which includes a second sorbent material. The airflow passes through the adsorption chambers 610, 620 while water is extracted from the airflow. The airflow exits the first adsorption chamber via outlet 614 and exits the water harvesting device, and the airflow exits the second adsorption chamber via outlet 624 and exits the water harvesting device. In this regard, the first adsorption chamber 610 includes a first water outlet 618 that enables desorbed water to leave the first adsorption chamber when valve 670 is opened. During active capturing of water, however, valve 670 remains in a closed position. In this regard, the second adsorption chamber 620 includes a second water outlet 628 that enables desorbed water to leave the second adsorption chamber when valve 690 is opened. During active capturing of water, however, valve 690 remains in a closed position. While the first sub-system 600 is actively capturing water, the second sub-system 700 may be actively desorbing or releasing water previously captured. During the desorbing or water releasing state, valves 701 and 721 remain closed to ensure that external airflow (e.g., atmospheric air) does not enter into the third adsorption column 710 and the fourth adsorption column 720 via inlets 718 and 728. Although the third and fourth adsorption columns 710,720 include airflow outlets 714,724, passage of airflow through these outlets may be prevented during the desorption or water releasing operational state. Third adsorption column 710 includes a third water outlet 718, which enables released water to exit the third adsorption column when valve 770 is open, and the fourth adsorption column 720 includes a fourth water outlet 728, which enables released water to exit the fourth adsorption chamber when valve 790 is open. The released water exiting the third adsorption column 710 and the fourth adsorption column 720 may be channeled to a liquid water collection component 900. For sake of simplicity, FIG. 7 does not show an air intake apparatus, a heat source, a vacuum source, or a condenser as described above and illustrated in other figures. It should be noted that one or more of these features can be included in the water harvesting device illustrated by FIG. 5A.

Figure 8:
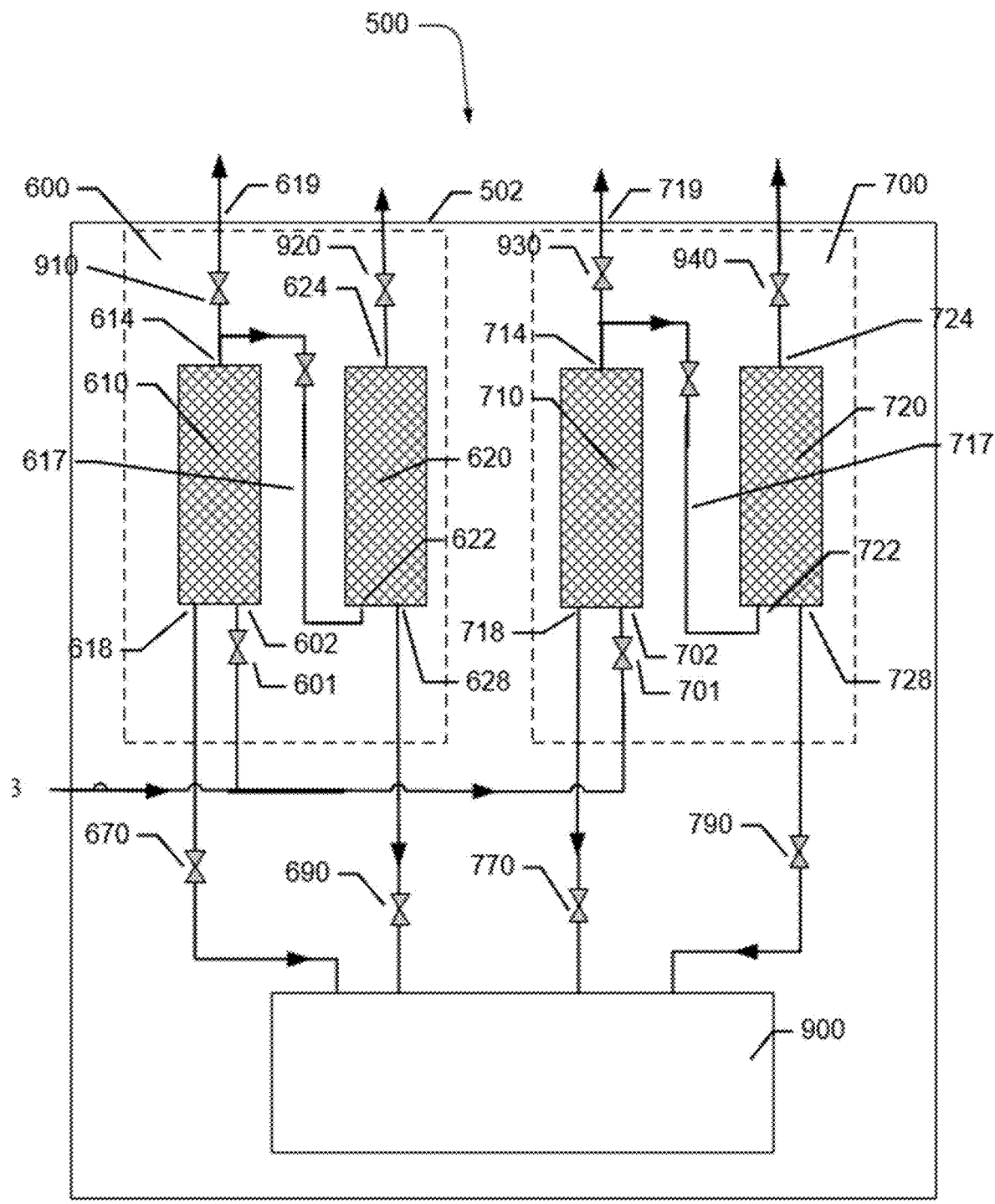
FIG. 8 illustrates a water harvesting device similar to FIG. 7, but the absorption columns with each sub-system may be operated in series in accordance with certain embodiments of the invention.

FIG. 8 illustrates a water harvesting device similar to FIG. 7, but the absorption columns within each sub-system may be operated in series in accordance with certain embodiments of the invention. For example, valve 910 of the first sub-system 600 may be closed to force the airflow exiting the first adsorption chamber 610 to the air inlet 622 of the second adsorption chamber 620. After passing through the second adsorption chamber 620, the airflow may be expelled from the water harvesting device by opening valve 920. The second sub-system 700 may have a similar configuration, in which valve 930 remains closed to force the airflow exiting the third adsorption column 710 to enter the fourth adsorption column 720 via air inlet 722. After passing through the fourth adsorption chamber 720, the airflow may be expelled from the water harvesting device by opening valve 940.

Figure 9:
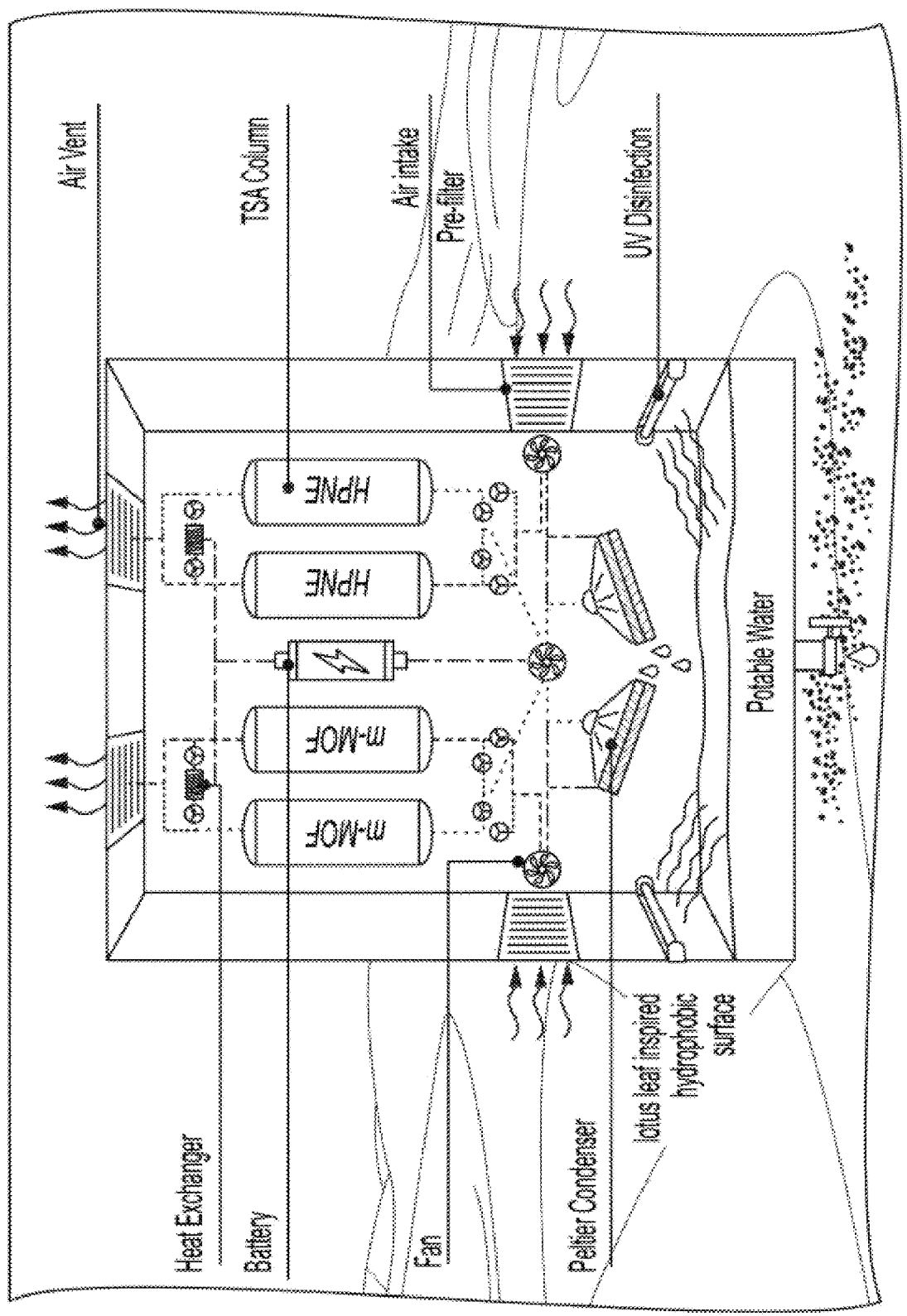
FIG. 9 illustrates a labeled schematic of a water harvesting device in accordance with certain embodiments of the invention.

FIG. 9 illustrates a labeled schematic of a water harvesting device in accordance with certain embodiments of the invention. The water harvesting device illustrated by FIG. 9, for example, illustrates air intake pre-filters two sets of adsorption columns, a battery as a heater source for effectuating a TSA process. FIG. 9 also illustrates a power source (e.g., a battery) operatively connected to a plurality of air intake apparatuses (e.g., fans) as well as a desorbing air-removal apparatus (e.g., a fan) that can facilitate pulling water and/or moist air out of the adsorption columns during a desorbing process. FIG. 9 illustrates that the desorbing air-removal apparatus directs the release water and/or moist air from the adsorption columns to a condenser prior to being collected as potable liquid water for use (e.g., consumption).

In another aspect, the invention provides a method of harvesting water from air. In accordance with certain embodiments, the method may comprises providing a water harvesting device, in which the water harvesting device includes at least one adsorption column (e.g., a temperature swing adsorption (TSA) column and/or a pressure swing adsorption (PSA) column) having a sorbent material located within an interior region of the at least one adsorption column. The sorbent material may comprise a plurality of nanofiber composites. The plurality of nanofiber composites may each comprise a polymeric material defining a continuous phase and at least one MOF material defining a discontinuous phase. In accordance with certain embodiments, the method may comprise initiating intake of air from an environment into the device and retaining water on or within the sorbent material. The method may also comprise releasing at least a portion of the water retained by the sorbent material by directly or indirectly increasing the temperature of the sorbent material and/or reducing the pressure within the at least one adsorption chamber. The method may also comprises collecting the portion of water.

In accordance with certain embodiments, the method may comprises providing a water harvesting device, in which the water harvesting device includes at least one adsorption column (e.g., a TSA column and/or a PSA column) having a sorbent material, such as any sorbent material disclosed and described herein, located within an interior region of the at least one adsorption column. In accordance with certain embodiments, the method may comprise initiating intake of air from an environment into the device and retaining water on or within the sorbent material. The method may also comprise releasing at least a portion of the water retained by the sorbent material by directly or indirectly increasing the temperature of the sorbent material and/or reducing the pressure within the at least one adsorption chamber. The method may also comprises collecting the portion of water. In accordance with certain embodiments of the invention, the water harvesting device used in accordance with methods of harvesting water from air may include any water harvesting device as described and disclosed herein.

In accordance with certain embodiments of the invention, the method may comprise retaining water within or on the plurality of hydrogel-based fibers and/or a plurality of nanofiber composites when the relative humidity of the air from the environment is above 30%, such as at least about any of the following: 30, 40, 50, 60, 70, 80, and 90%, and/or at most about any of the following: 100, 95, 90, 85, and 80%. Additionally or alternatively, the method may comprise retaining water within one or more MOF material and/or one or more nanofiber composites when the relative humidity of the air from the environment is below 30%, such as at least about any of the following: 5, 10, 15, 20, and 25%, and/or at most about any of the following: 30, 25, and 20%.

In accordance with certain embodiments of the invention, the method may comprise retaining water within a first adsorption column while simultaneously desorbing or releasing water, which was previously captured from an air source, from the second adsorption column. For example, the method may comprise capturing or retaining water from an air source (e.g., airflow passing through the water harvesting device) in a first adsorption column and/or a third adsorption column, while simultaneously desorbing or releasing water, which was previously captured from an air source, from a second adsorption column and/or a fourth adsorption column.

In accordance with certain embodiments of the invention, the method may comprise initiating an airflow from the environment, into and through the second adsorption column including the plurality of hydrogel-based nanofibers, into and through the first adsorption chamber column including one or more MOF materials and/or one or more nanofiber composites, and through the air outlet. In accordance with certain embodiments of the invention, the method may comprise initiating an airflow from the environment, into and through the second adsorption column including the plurality of hydrogel-based nanofibers and/or one or more nanofiber composites, into and through the first adsorption chamber column including one or more MOF materials and/or one or more nanofiber composites, and through the air outlet.

In accordance with certain embodiments of the invention, the method may comprise selecting the operation of a particular adsorption chamber based on the relative humidity of the environment. For example, a user may interact with a user interface of the water harvesting device to select one or more adsorption column having a particular sorbent material. For example, in an arid environment the user may select to operate (e.g., capture water from air) an adsorption column including one or more MOF materials and/or one or more nanofiber composites.

In accordance with certain embodiments of the invention, the method may comprise in-taking air from the environment that has an initial humidity of at least 30%, such as at least about any of the following: 30, 40, 50, 60, 70, 80, and 90%, and/or at most about any of the following: 100, 95, 90, 85, and 80%, and an intermediate airflow between the second adsorption column and the first adsorption column has a second humidity that is less than the initial humidity.

In accordance with certain embodiments of the invention, the method may comprise performing a TSA process with one or more of the adsorption columns by cycling the temperature of the sorbent material (e.g., either directly or indirectly) and/or the air within the adsorption chamber to effectuate water capture or retention (e.g., adsorption, absorption) at a first temperature and effectuate desorbing or release of previously captured water by the sorbent material at a second temperature, in which the second temperature is larger than the first material. In this regard, the TSA process can include cycling the temperature of the sorbent material and/or the air within the adsorption chamber multiple times during operation to provide repeating cycles of capturing water from atmospheric air, desorbing and collecting the water captured, capturing a second batch of water from atmospheric air, desorbing the second batch of captured air and collecting the same, and so on.

In accordance with certain embodiments of the invention, the temperature (e.g., either the temperature of sorbent material or the temperature of the air within the adsorption chamber) at which water capture is performed in the one or more adsorption chambers comprises from about 0° C. to about 50C°, such as at least about any of the following: 0, 2, 5, 6, 8, 10, 12, 15, 16, 18, 20, 22, 25, 30, 40 and 50C° and/or at most about any of the following: 50, 48, 46, 45, 44, 42, 40, 38, 36, 35, 34, 32, and 30° C.

In accordance with certain embodiments of the invention, the method may comprise performing a PSA process with one or more of the adsorption columns by cycling the pressure within the adsorption chamber to effectuate water capture or retention (e.g., adsorption, absorption) at a first pressure and effectuate desorbing or release of previously captured water by the sorbent material at a second pressure, in which the second temperature is lower than the first material. In this regard, the PSA process can include cycling the pressure within the adsorption chamber multiple times during operation to provide repeating cycles of capturing water from atmospheric air, desorbing and collecting the water captured, capturing a second batch of water from atmospheric air, desorbing the second batch of captured air and collecting the same, and so on.

In accordance with certain embodiments of the invention, the relative pressure within the adsorption chamber at which water capture is performed in the one or more adsorption chambers comprises from about 0.01 to about 10, such as at least about any of the following: 0.01, 0.05, 0.1, 0.2, 0.4, 0.6, 0.8, 1, 1.5, 2, 2.5, 3, 3.5, 4, 4.5, and 5, and/or at most about any of the following: 10, 9, 8, 7, 6, and 5. In accordance with certain embodiments of the invention, the relative pressure within the adsorption chamber at which water desorption is performed in the one or more adsorption chambers is less than the relative pressure in the at least one adsorption chamber during the water capturing operating conditions. With this proviso in mind, the relative pressure within the at least one adsorption chamber during water desorption may comprise from about 0.01 to about 9.5, such as at least about any of the following: 0.01, 0.05, 0.1, 0.2, 0.4, 0.6, 0.8, 1, 1.5, 2, 2.5, 3, 3.5, 4, 4.5, and 5, and/or at most about any of the following: 9.5, 9, 8, 7, 6, and 5.

In accordance with certain embodiments of the invention, the pressure within the one or more adsorption chambers during a water retention/water capturing operational state may vary from 1 to 18 mm Hg (dew point) at 20° C. At 15° C., the pressure within the one or more adsorption chambers during a water retention/water capturing operational state may vary from 1 to 15 mm Hg (dew point). As noted above, the release of previously captured water by a desorption operation may be carried out at a reduced pressure.

Working Examples

Figure 10:
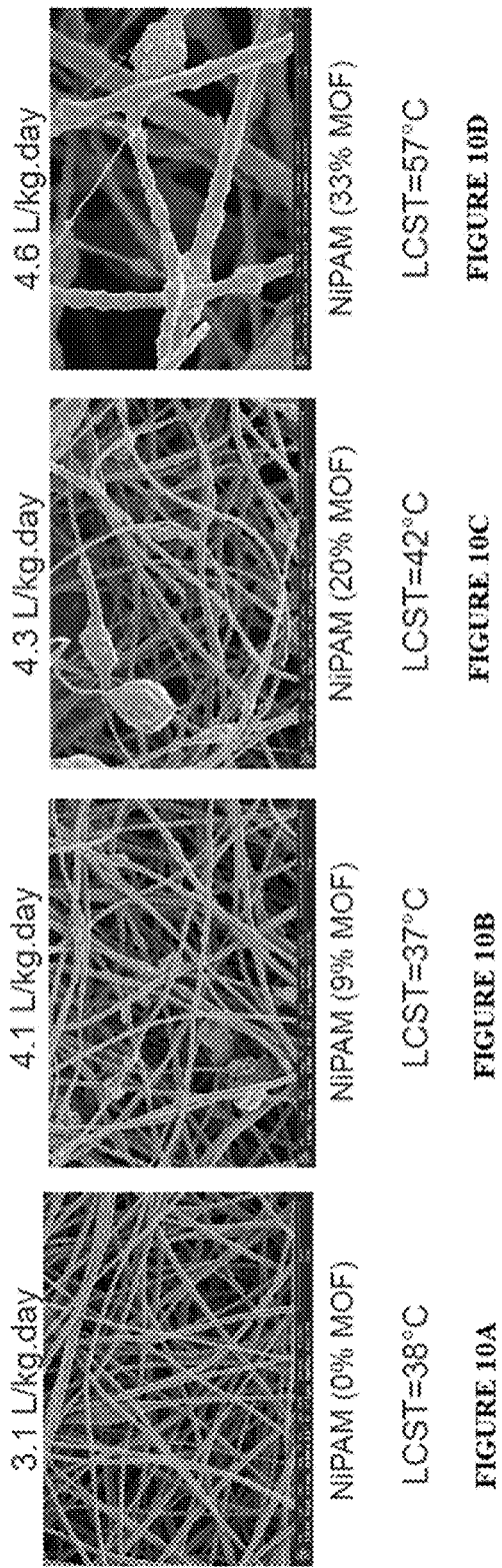
FIG. 10A shows a comparative nanofiber.
FIGS. 10B-10D show example nanofiber composites in accordance with certain embodiments of the invention.

A comparative nanofibers were formed from an electrospinning process, in which the nanofibers were formed from NIPAM and were devoid of any MOF materials. FIG. 10A shows the nanofibers being devoid of any MOF materials, which demonstrated a water harvesting capacity of 3.1 L/(kg*day) and a lower critical solution temperature (LCST) of 38° C. A variety of nanofiber composites were formed via the same electrospinning process in which different concentrations of an MOF (i.e., aluminum fumarate (AlFum)) were added. FIG. 10B shows nanofiber composites having 9% by weight of AlFum, and demonstrated a water harvesting capacity of 4.1 L/(kg*day) and a LCST of 37° C. FIG. 10C shows nanofiber composites having 20% by weight of AlFum, and demonstrated a water harvesting capacity of 4.3 L/(kg*day) and a LCST of 42° C. FIG. 10D shows nanofiber composites having 33% by weight of AlFum, and demonstrated a water harvesting capacity of 4.6 L/(kg*day) and a LCST of 57° C. In accordance with certain embodiments of the invention, the varying lower critical solution temperature may be exploited in water harvesting devices, such as those described and disclosed herein. For example, a water harvesting device may include a first adsorption column housing a first sorbent material having a first lower critical solution temperature and a second adsorption column housing a second sorbent material having a second lower critical solution temperature that is larger than the first lower critical solution temperature. In this regard, the first adsorption column of the water harvesting device may be utilized in cooler environments while the second adsorption column of the water harvesting device may be utilized in warmer environments. In this regard, the water harvesting devices may be used in a large range of environmental temperatures.

Figure 11:
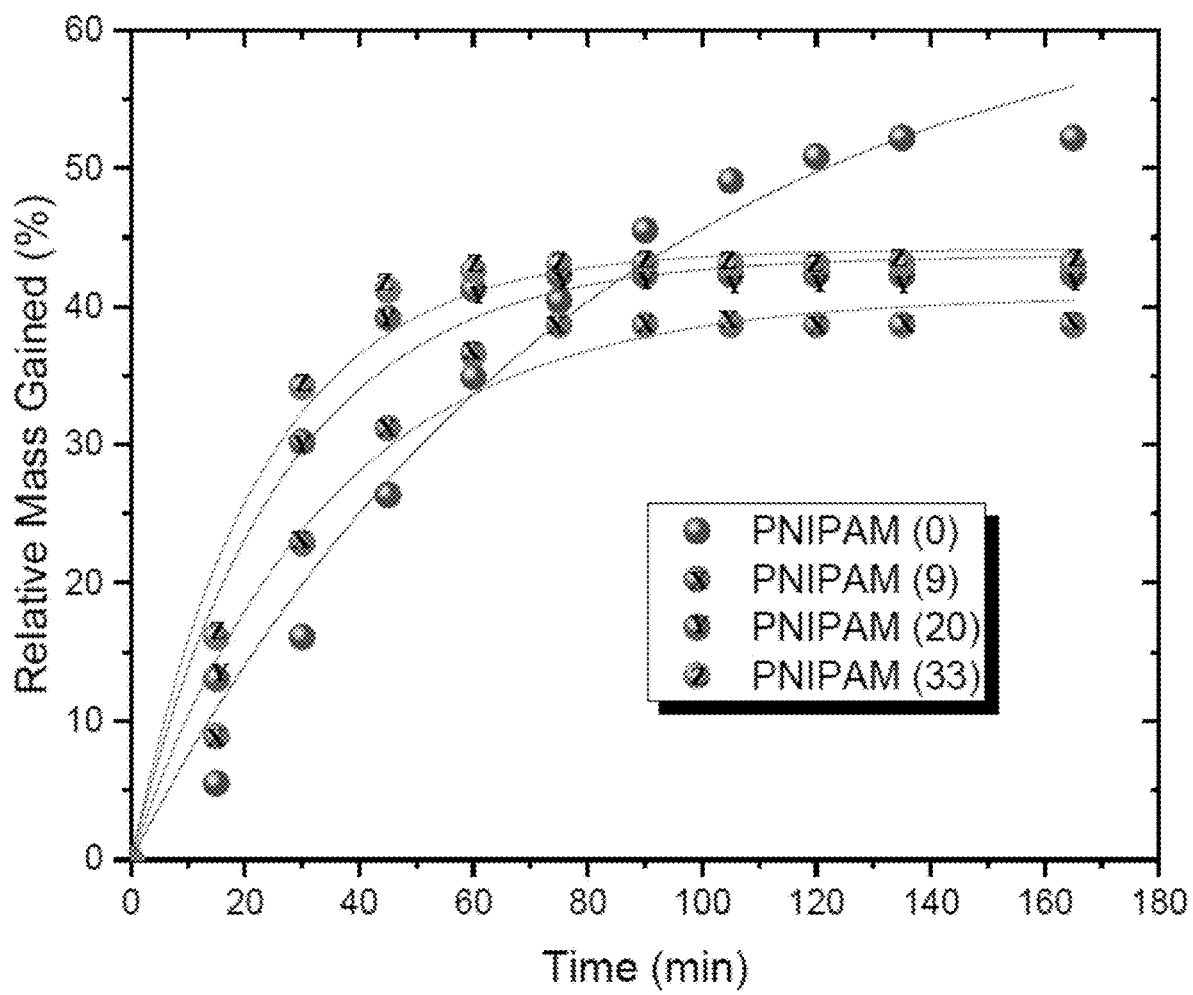
FIG. 11 shows a plot of relative mass gained (e.g., water mass) as a function of time for a comparative nanofiber and certain example nanofiber composites.
Figure 12:
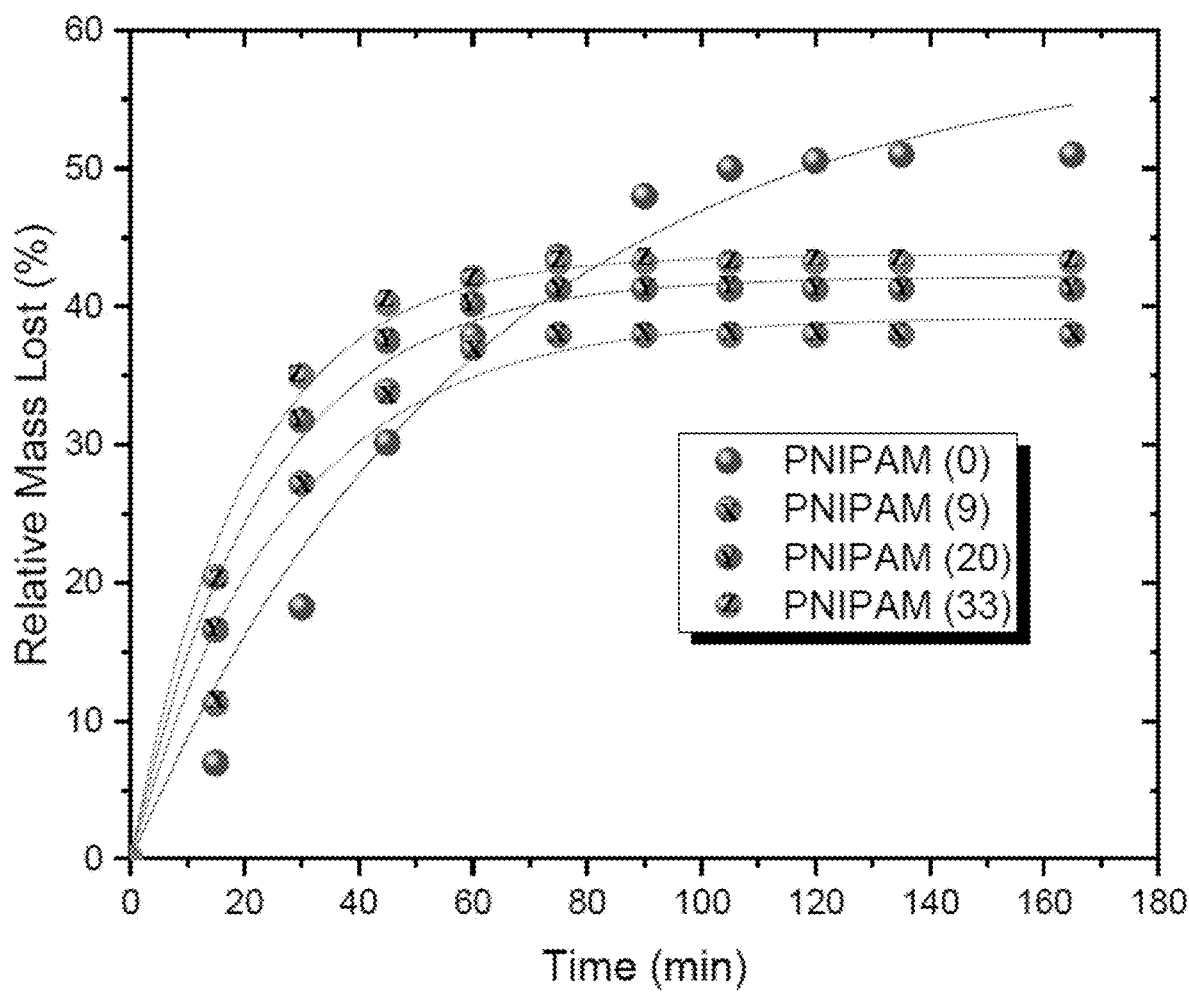
FIG. 12 shows a plot of relative mass lost/released (e.g., water mass desorbed) as a function of time for a comparative nanofiber and certain example nanofiber composites.

FIG. 11 shows a plot of relative mass gained (e.g., water mass) as a function of time for a comparative nanofiber and certain example nanofiber composites (i.e., 'x' has 9% MOF, 'Y' has 20% MOF, and 'Z' has 33% MOF by weight). As shown in FIG. 11, the nanofiber composites provided a much faster rate of water absorption compared to the comparative nanofiber, which was devoid of MOF. FIG. 12 shows a plot of relative mass lost/released (e.g., water mass desorbed) as a function of time for a comparative nanofiber and certain example nanofiber composites (i.e., 'x' has 9% MOF, 'Y' has 20% MOF, and 'Z' has 33% MOF by weight). As shown in FIG. 12, the nanofiber composites provided a much faster rate of water release compared to the comparative nanofiber, which was devoid of MOF.

These and other modifications and variations to embodiments of the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

What is claimed is:

1. A sorbent material comprising a nanofiber composite, the nanofiber composite comprising a polymeric material defining a continuous phase and at least one metal organic framework (MOF) material defining a discontinuous phase, wherein the at least one MOF material is dispersed throughout the continuous phase of the polymeric material, and wherein the polymeric material comprises a hydrogel polymer.

2. The sorbent material of claim 1, wherein the nanofiber composite has an average diameter from about 0.5 nm to about 5000 nm.

3. The sorbent material of claim 1, wherein the nanofiber composite is an electrospun fiber, a meltspun fiber, a solution-spun fiber, or a combination thereof.

4. The sorbent material of claim 1, wherein the nanofiber composite comprises a continuous fiber or a staple fiber, or a combination thereof.

5. The sorbent material of claim 1, wherein the polymeric material comprises N-isopropylacrylamide (NIPAM), a poly (NIPAM), a copolymer including NIPAM, or a polymeric blend including NIPAM and one more additional polymers.

6. The sorbent material of claim 1, wherein the polymeric material comprises from about 10% to about 100% by weight of NIPAM.

7. The sorbent material of claim 1, wherein the polymeric material comprises an average molecular weight of at least about 60,000 g/mol.

8. The sorbent material of claim 1, wherein the at least one MOF material comprises aluminum fumarate (AlFu).

9. The sorbent material of claim 1, wherein the at least one MOF material comprises one or more of the following: an average pore size from 5 angstroms (Å) to about 100 Å, an average surface area from 800 $m^2/g$ to 6000 $m^2/g$, a water uptake capacity from 10 to 5000 grams (g) of water per kilogram (kg) of MOF material, and a water desorption percentage from 15 to 100% by weight.

10. A fibrous mat, comprising a plurality of nanofiber composites, wherein
a nanofiber composite of the plurality of nanofiber composites comprises a polymeric material defining a continuous phase and at least one metal organic framework (MOF) material defining a discontinuous phase,
the at least one MOF material is dispersed throughout the continuous phase of the polymeric material, and
the polymeric material comprises a hydrogel polymer.

11. The fibrous mat of claim 10, wherein the fibrous mat comprises a woven fabric or a nonwoven fabric, or a combination thereof.

12. A method of making a sorbent material, comprising:
(i) forming a spinning composition comprising a polymeric material and at least one metal organic framework (MOF) material dispersed throughout the polymeric material; and
(ii) forming one or more nanofiber composites from the spinning solution, the one or more nanofiber composites including the polymeric material defining a continuous phase and the least one MOF material defining a discontinuous phase dispersed throughout the continuous phase of the polymeric material.

13. The method of claim 12, wherein forming one or more nanofiber composites comprises electrospinning the spinning composition, meltspinning the spinning composition, or solution-spinning the spinning composition.

14. The method of claim 12, wherein the spinning composition includes one or more organic solvents or an aqueous solvent.

15. The method of claim 12, wherein the at least one MOF material is dissolved in the spinning composition or suspended within the spinning composition.

16. A water harvesting device, comprising:
(i) at least one adsorption column, the at least one adsorption column includes at least a first adsorption column including a first inlet, a first outlet, and a first interior region; and
(ii) a sorbent material located within the first interior region of the first adsorption column, the sorbent material comprising a first plurality of nanofiber composites including a polymeric material defining a continuous phase and at least one metal organic framework (MOF) material defining a discontinuous phase, wherein the at least one MOF material is dispersed throughout the continuous phase of the polymeric material, and wherein the polymeric material comprises a hydrogel polymer.

17. The water harvesting device of claim 16, wherein the at least one adsorption column comprises a temperature swing adsorption (TSA) column, a pressure swing adsorption (PSA) column, or both.

18. The water harvesting device of claim 17, wherein the at least one adsorption column further comprises a heat source operatively connected to at least a first TSA column.

19. The water harvesting device of claim 17, wherein the at least one adsorption column further comprises a vacuum source operatively connected to at least a first PSA column.

* * * * *